(12) United States Patent
Lee et al.

(10) Patent No.: US 10,397,808 B2
(45) Date of Patent: Aug. 27, 2019

(54) METHOD AND APPARATUS FOR DEVICE-TO-DEVICE DATA COMMUNICATION

(71) Applicants: Samsung Electronics Co., Ltd., Gyeonggi-do (KR); Research & Business Foundation Sungkyunkwan University, Gyeonggi-do (KR)

(72) Inventors: Ho-Yeon Lee, Gyeonggi-do (KR); Sang-Hyo Kim, Gyeonggi-do (KR); Hyung-Jin Choi, Seoul (KR); Sung-Hoon Kim, Seoul (KR); Young-Kyo Baek, Seoul (KR); Jung-Je Son, Gyeonggi-do (KR); Hyun-Jae Lee, Gyeonggi-do (KR); Seung-Ri Jin, Gyeonggi-do (KR); Han-Jun Kim, Seoul (KR); Kyung-Hoon Lee, Gyeonggi-do (KR)

(73) Assignees: Samsung Electronics Co., Ltd (KR); Research & Business Foundation Sungkyunkwan University (KR)

( * ) Notice: Subject to any disclaimer, the term of this patent is extended or adjusted under 35 U.S.C. 154(b) by 0 days.

(21) Appl. No.: 16/025,389

(22) Filed: Jul. 2, 2018

(65) Prior Publication Data

US 2019/0007846 A1 Jan. 3, 2019

(30) Foreign Application Priority Data

Jul. 3, 2017 (KR) .................. 10-2017-0084499

(51) Int. Cl.
*H04B 7/00* (2006.01)
*H04W 24/02* (2009.01)
(Continued)

(52) U.S. Cl.
CPC .......... *H04W 24/02* (2013.01); *H04B 17/318* (2015.01); *H04W 4/02* (2013.01);
(Continued)

(58) Field of Classification Search
CPC ....... H04W 24/02; H04W 4/02; H04W 72/04; H04W 92/18; H04B 17/318
(Continued)

(56) References Cited

U.S. PATENT DOCUMENTS

2011/0317644 A1 12/2011 Fang et al.
2013/0258968 A1 10/2013 Hong et al.
(Continued)

FOREIGN PATENT DOCUMENTS

KR 1020110140000 12/2011
KR 1020130109414 10/2013

OTHER PUBLICATIONS

Mobile Country Code (MCC) and Mobile Network Code (MNC), http://www.3glteinfo.com/mobile-country-code-mcc-and-mobile-network-code-mnc/#A, Copyright © 2018 3GLTEInfo, pp. 2.
(Continued)

*Primary Examiner* — Huy C Ho
(74) *Attorney, Agent, or Firm* — The Farrell Law Firm, P.C.

(57) ABSTRACT

Disclosed is a fifth generation (5G) or pre-5G communication system for supporting higher data transmission rates beyond fourth generation (4G) communication systems such as LTE systems. A data communication method includes receiving information about a reception rate of a signal from a second user equipment (UE) performing device-to-device (D2D) communication with a first UE, receiving location information about at least one of the first UE and the second UE, determining a data communication configuration for the D2D communication based on the reception rate information
(Continued)

and the location information, and transmitting the determined data communication configuration to at least one of the first UE and the second UE.

20 Claims, 26 Drawing Sheets

(51) Int. Cl.
| | |
|---|---|
| *H04W 4/02* | (2018.01) |
| *H04W 72/04* | (2009.01) |
| *H04B 17/318* | (2015.01) |
| *H04W 28/22* | (2009.01) |
| *H04W 52/38* | (2009.01) |
| *H04W 92/18* | (2009.01) |
| *H04W 52/24* | (2009.01) |
| *H04W 52/26* | (2009.01) |

(52) U.S. Cl.
CPC ......... *H04W 28/22* (2013.01); *H04W 52/383* (2013.01); *H04W 72/04* (2013.01); *H04W 52/245* (2013.01); *H04W 52/267* (2013.01); *H04W 72/048* (2013.01); *H04W 92/18* (2013.01)

(58) Field of Classification Search
USPC ........................................ 455/41.1
See application file for complete search history.

(56) References Cited

U.S. PATENT DOCUMENTS

| | | | | |
|---|---|---|---|---|
| 2014/0206322 | A1* | 7/2014 | Dimou | ............... H04W 76/14 455/414.1 |
| 2018/0124707 | A1 | 5/2018 | Lee et al. | |

OTHER PUBLICATIONS

Garside, Juliette, Wave of merger mania could change the face of UK telecoms industry, Nov. 29, 2014 . . . https://www.theguardian.com/business/2014/nov/30/merger-fever-uk-telecoms-industry-bt-ee-o2, © 2018 Guardian News and Media Limited or its affiliated companies, pp. 1.

Netmanias, LTE Identification II: NE, Location 및 PDN 식별자,, https://www.netmanias.com/ko/?m=view&id=techdocs&no=5161, Copyright © 2002-2018 NMC Consulting Group, pp. 1.

3GPP TR 36.885 V2.0.0 (Jun. 2016), 3rd Generation Partnership Project; Technical Specification Group Radio Access Network; Study on LTE-based V2X Services; (Release 14) . . . © 2013, 3GPP Organizations Partners (ARIB, ATIS, CCSA, ETSI, TTA, TTC), pp. 220.

ETSI EN 302 637-2 V1.3.2 (Nov. 2014), Intelligent Transport Systems (ITS); Vehicular Communications; Basic Set of Applications; Part 2: Specification of Cooperative Awareness . . . Basic Service, © European Telecommunications Standards Institute 2014, pp. 44.

Surface Vehicle Standard, (R) Dedicated Short Range Communications (DSRC) Message Set Dictionary, Issue Dec. 2006, Revised Sep. 2015, © 2015 SAE International, pp. 402.

3GPP TS 23.003 V14.0.0 (Jun. 2016), 3rd Generation Partnership Project; Technical Specification Group Core Network and Terminals; Numbering, addressing and identification . . . (Release 14), © 2016, 3GPP Organizational Partners (ARIB, ATIS, CCSA, ETSI, TSDSI, TTA, TTC), pp. 102.

* cited by examiner

[VEHICLE STATE MESSAGE]

[PEDESTRIAN STATE MESSAGE]

[PASSENGER STATE MESSAGE]

METHOD AND APPARATUS FOR DEVICE-TO-DEVICE DATA COMMUNICATION

CROSS-REFERENCE TO RELATED APPLICATION(S)

This application is based on and claims priority under 35 U.S.C. § 119 to Korean Patent Application No. 10-2017-0084499, filed on Jul. 3, 2017, in the Korean Intellectual Property Office, the disclosure of which is incorporated by reference herein in its entirety.

BACKGROUND

1. Field

The disclosure relates generally to methods and apparatuses for transmitting and receiving data, and more specifically, to device-to-device (D2D) data communication methods and apparatuses.

2. Description of Related Art

In order to meet the demand for wireless data traffic that has substantially increased since the 4th generation (4G) communication system came to the market, efforts have been made to develop enhanced 5th generation (5G) communication systems or pre-5G communication systems, also referred to as the beyond 4G network communication system or post long term evolution (LTE) system.

For higher data transmit rates, 5G communication systems are implemented in ultra high frequency bands (mm-Wave), such as 60 gigahertz (GHz). To mitigate pathloss in the ultra high frequency band and increase the reach of radio waves, beamforming, massive multi-input multi-output (MIMO), full dimensional MIMO (FD-MIMO), array antenna, analog beamforming, and large-scale antenna are considered for the 5G communication systems.

Also being developed are various technologies for the 5G communication system to have an enhanced system network, such as evolved or advanced small cell, cloud radio access network (cloud RAN), ultra-dense network, D2D communication, wireless backhaul, moving network, cooperative communication, coordinated multi-point (CoMP), and reception interference cancellation.

Additional schemes under development for the 5G system include hybrid frequency shift keying (FSK), quadrature amplitude modulation (QAM), frequency quadrature amplitude modulation (FQAM), and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

LTE-based communication technology may apply in non-safety and safety services depending on the purposes of services provided to users. Non-safety services are offered for commercial uses and users' convenience, such as for voice call, text messaging, advertisement, games, social media, and location-based services (LBSs) that are supported by legacy cellular systems. Safety services are provided for users' safety and require a higher level of communication reliability and security than non-safety services.

LTE safety services attract more attention since user safety is a major social concern, and thus, standardization is underway for LTE-based public safety services capable of supporting high data rate packet communication up to a few hundreds of megabits per second (Mbps) between terminals and a wireless access network while the terminals are in motion. A representative example of this standardization is D2D technology.

However, there exists a need in the art for improved D2D data transmission/reception methods and apparatuses that secures the safety of wireless terminals.

SUMMARY

The present disclosure has been made to address the above-mentioned problems and disadvantages, and to provide at least the advantages described below.

Accordingly, an aspect of the present disclosure is to provide a method and apparatus for transmitting and receiving data to secure the safety of terminal users in a D2D communication-supportive wireless communication system.

In accordance with an aspect of the disclosure, a data transmission/reception method includes receiving information about a reception rate of a signal from a second user equipment (UE) performing D2D communication with a first UE, receiving location information about at least one of the first UE and the second UE, determining a data transmission/reception configuration for the D2D communication based on the reception rate information and the location information, and transmitting the determined data transmission/reception configuration to at least one of the first UE and the second UE.

In accordance with another aspect of the disclosure, a data transmission/reception method includes transmitting information about a reception rate of a signal to a base station, the signal received from a first UE, and the reception rate information generated based on the signal, receiving a data transmission/reception configuration for the D2D communication determined based on location information about at least one of the first UE and the second UE and the reception rate information, and performing data transmission/reception with the first UE based on the data transmission/reception configuration.

In accordance with another aspect of the disclosure, a base station includes a transceiver configured to receive information about a reception rate of a signal from a second UE performing D2D communication with a first UE and receive location information about at least one of the first UE and the second UE and a processor configured to determine a data transmission/reception configuration for D2D communication based on the reception rate information and the location information and control the transceiver to transmit the determined data transmission/reception configuration to at least one of the first UE and the second UE.

In accordance with another aspect of the disclosure, a UE includes a transceiver and a processor configured to control the transceiver to transmit, to a base station, information about a reception rate of a signal received from the first UE, and the reception rate information generated based on the signal, receive a data transmission/reception configuration for the D2D communication determined based on location information about at least one of the first UE and the second UE and the reception rate information, and perform data transmission/reception with the first UE based on the data transmission/reception configuration.

BRIEF DESCRIPTION OF THE DRAWINGS

The above and other aspects, features and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Hereinafter, embodiments of the disclosure are described in detail with reference to the accompanying drawings. It should be noted that the following description primarily focuses on what is necessary for understanding the operations of the embodiments, omitting descriptions unnecessary for clarifying the subject matter of the present disclosure. The terms described below are defined considering the functions in embodiments of the present disclosure and may be replaced with other terms according to the intention or practice of the user or operator. Therefore, the terms should be defined based on the overall disclosure.

Although an LTE system is described below as an example in connection with embodiments, the same manner of application may be directed to any system in which a terminal (or a mobile station) corresponding to a UE transmits scheduling information requiring available transmit power information or periodic transmission to a base station corresponding to an evolved node-B (eNB).

It should be appreciated that the present disclosure is not limited to the embodiments, and all changes and/or equivalents or replacements thereto also belong to the scope of the present disclosure.

Unless otherwise defined in connection with embodiments of the present disclosure, all terms including technical and scientific terms used herein have the same meaning as commonly understood by one of ordinary skill in the art to which the embodiments of the present disclosure pertain. It will be further understood that terms, such as those defined in commonly used dictionaries, should be interpreted as having a meaning that is consistent with their meaning in the context of the relevant art and will not be interpreted in an idealized or overly formal sense unless expressly so defined herein. As used herein, the term "information" and expression "information item" may be interchangeably used for the purpose of description without departing from the scope of the present disclosure.

In connection with various embodiments, examples in which a terminal and a base station operate are described below. However, this is solely for ease-of-description purposes and does not exclude when the operations are performed by a processor or transceiver of the terminal or the base station.

Figure 1:
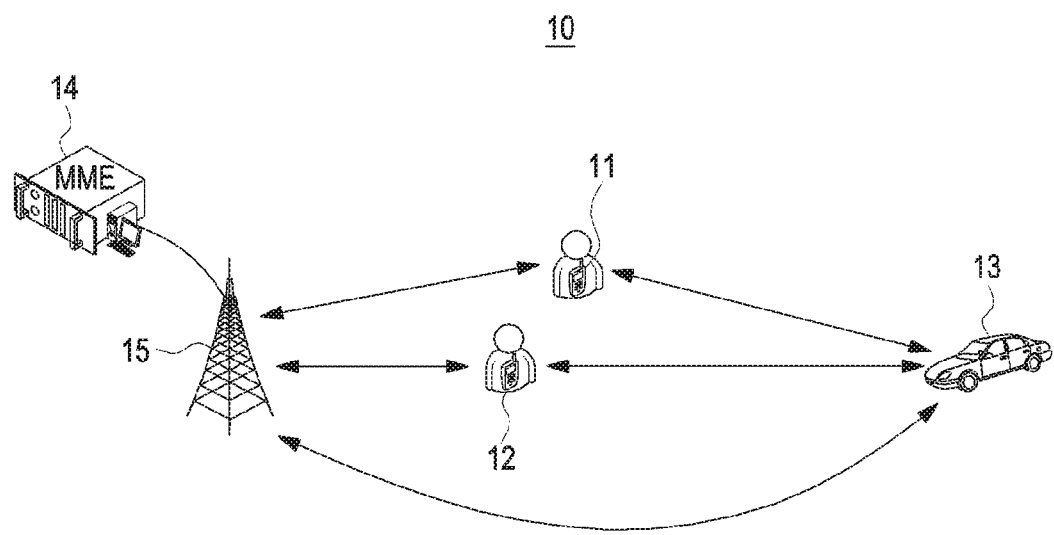
FIG. 1 illustrates a wireless network according to an embodiment.

FIG. 1 illustrates a wireless network according to an embodiment.

Referring to FIG. 1, a wireless network 10 includes UEs 11, 12, and 13 and a mobility management entity (MME) 14. The UEs 11, 12, and 13 include pedestrian UEs (P_UE) 11 and 12 and a vehicle UE (V_UE) 13. The UEs may also be denoted in other various terms, such as devices, terminals, vehicles, mobile stations, or subscriber stations. As used herein, 'UE' may be appreciated as a terminal supporting D2D communication. Specifically, FIG. 1 illustrates vehicle-to-everything (V2X) components in a 3GPP LTE wireless mobile communication system.

The pedestrian UEs 11 and 12 and the vehicle UE 13 perform PC5 (a new communication standard described below) interface-based pedestrian-to-vehicle (P2V) and vehicle-to-pedestrian (V2P) communication. D2D communication interface standards defined by the 3GPP may be referenced for the PC5 interface. The MME 14 is a network component managing mobility in the LTE system and manages mobility information about the UEs 11 and 12.

The base station 15 allocates resources to the UEs 11, 12, and 13 and may perform data transmission/reception between the UEs 11, 12, and 13 and the MME 14.

The 3GPP standardizes public safety-LTE (PS-LTE) technology aiming to provide public safety services and has representative techniques include proximity based service (ProSe), group communication system enabler (GCSE), and other D2D-type communication schemes.

D2D communication enables direct communication between the UEs 11, 12, and 13 without passing through another entity, such as the base station 15 or an access point (AP). The 3GPP defines LTE network-based communication between the UEs 11, 12, and 13, which are located within a short range, as ProSe. A D2D UE 11, 12, or 13 supporting ProSe-based D2D communication technology directly transmits or receives signals to/from other close UE(s) 11, 12, or 13, and thus has a low latency time and a high transmission rate compared with the legacy communication scheme performing communication via a cellular infrastructure. Accordingly, these D2D UEs can efficiently support the public safety service that is required to meet higher-level conditions. Since D2D communication technology performs direct communication between the UEs 11, 12, and 13 without the aid of the base station 15, this technology can distribute traffic which would otherwise be concentrated onto the base station 15, relieving the cellular network of load. D2D communication technology reuses radio frequency resources to simultaneously generate multiple DD communication links in the cell, raising frequency efficiency, and enables a D2D terminal located off of network service coverage to access the base station by UE-to-network relay, substantially expanding the cellular coverage.

LTE-based D2D communication technology may be divided into direct discovery by which a UE 11 or 12 discovers another UE 13 of interest and direct communication by which a UE 11 or 12 communicates with another UE 13. As per the third generation partnership project (3GPP), direct discovery may come in model A ("I am here") in which a UE 11 or 12 notifies its neighbor UE 13 of its presence or identity and model B ("Who is there?") in which a UE 11 or 12 identifies the presence or identity of its neighbor UE 13. Direct discovery aims to discover as many neighbor D2D UEs 13 as possible within a given time. Direct communication is for directly transferring traffic between two or more neighbor UEs (11 and 13, 12 and 13, or 11 and 12) without relying upon an infrastructure, such as the base station 15. In some cases, direct communication with a discovered UE 13 may be performed after inter-UE discovery, and in other cases, inter-UE direct communication may be performed without performing direct discovery. Whether inter-UE direct discovery is needed or not may vary depending on D2D service scenarios. Direct communication aims to broadcast data to as many neighbor UEs as possible. D2D direct discovery and direct communication may be utilized for various commercial purposes, such as advertisement, friend search, social media, issuing coupons, or games, as well as LTE resource-based public safety services.

A PC5 interface may be used to perform D2D direct discovery and direct communication, and is newly defined by the 3GPP to provide ProSe and enable use of a control/user plane for the purposes of discovery, communication, and relaying between the D2D UEs 11, 12, and 13. An example of another interface is LTE-Uu which may serve as a reference used to connect the UEs 11, 12, and 13 to the base station 15 in the LTE-based communication. The LTE-Uu interface may be utilized upon use of the UE-to-network-relay function in the D2D communication.

Since D2D communication technology has been developed to meet high-level communication conditions to support the public safety service, this technology can be used in V2X communication for the safety of drivers and pedestrians. As an example, the PC5 interface may be used in V2X services and is an inter-UE radio link defined for D2D communication. As another example, the LTE-Uu interface may be used in V2X services and is a radio link between the UE 11, 12, or 13 and the base station 15 used in the LTE cellular communication. As to communication conditions for providing V2X services, upon denoting the valid communication range and the minimum message reception rate in meters (m)/percent (%), the following conditions should be met: 200 m/90% for outskirts, 320 m/80% for auto roads or highways, and 100 m/90% for non-link-of-sight (NLOS) environments. The maximum allowed message delay should meet 100 ms in all the scenarios.

The 3GPP-defined V2X encompasses vehicle-to-vehicle (V2V) which is communication between V_UE1 and V_UE2, vehicle-to-infrastructure (V2I) which is communication between V_UE and infrastructure, vehicle-to-network (V2N) which is communication between V_UE and application server, and V2P which is communication between V_UE and P_UE. In particular, the 3GPP is discussing schemes for stably providing PC5 interface-based P2V/V2P services directly related to pedestrian and driver lives. In P2V, a P_UE broadcasts necessary messages to a V_UE whereas in V2P, the V_UE broadcasts messages to the P_UE.

The 3GPP may take advantage of inter-public land mobile network (PLMN) communication to seamlessly offer V2X services. Inter-PLMN communication occurs between different communication service providers (herein "carriers"). Since V2X services are directly related to driver and pedestrian safety, V_UE and P_UE should be able to receive V2X messages from all or many of the carriers' networks.

Various embodiments of LTE network-based P2V/V2P communication operation schemes are described below in detail with reference to the drawings.

Figure 2:
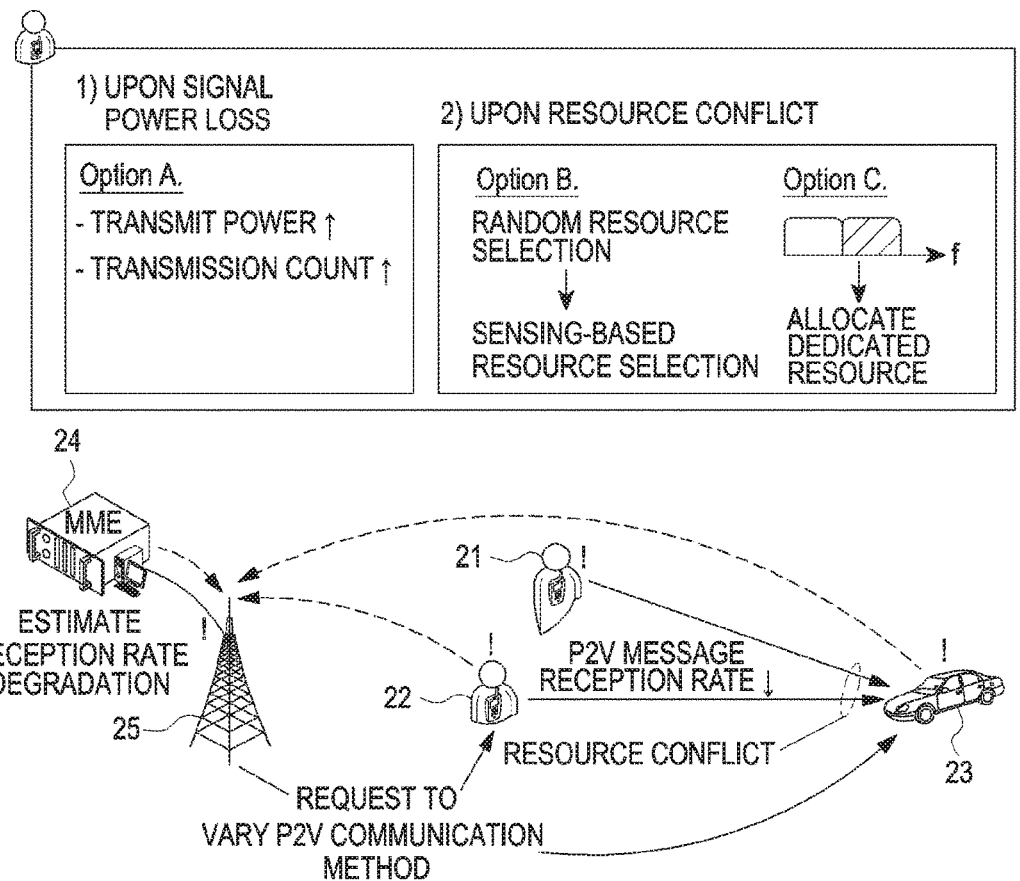
FIG. 2 illustrates a pedestrian-to-vehicle/vehicle-to-pedestrian (P2V/V2P) communication operation scheme according to an embodiment.

FIG. 2 illustrates a P2V/V2P communication operation scheme according to an embodiment.

The P2V/V2P communication operation scheme may include i) an operation for recognizing a degradation in the P2V link reception rate and ii) an operation for switching P2V communication methods. To recognize a degradation in the P2V reception rate, the base station may receive location information from the MME, such as coordinate or mobility information.

The operation for recognizing a degradation in the P2V link (or message) reception rate may include a V_UE 23, a P_UE 21 or 22, and a network, such as the base station 25 or the MME 24, depending on the receiving entity of the link.

Upon recognizing a degradation in the P2V link reception rate, the V_UE 23 may transmit reception rate-related information to the base station 25, which may recognize the degradation in the P2V link reception rate through the reception rate-related information.

The base station 25 may determine the cause of the degradation in the P2V link reception rate based on at least one of the mobility information and location information about the P_UE 21 or 22 and the V_UE 23. For example, the base station 25 may determine the distance between the P_UE 21 or 22 and the V_UE 23 based on the location information about the V_UE 23 and the P_UE 21 or 22. In this case, when the distance is a preset value or more, the base station 25 may determine that the degradation in the P2V link reception rate is caused by the spacing between the P_UE 21 or 22 and the V_UE 23, in which case the base station 25 may determine that the reception rate-related information is valid information.

Referring to FIG. 2, the base station 25 may send a request for varying the data transmission/reception configuration for temporary/continuous D2D communication to the P_UE/V_UE 21, 22, or 23 based on a configuration to increase the transmission count or transmit power of P2V messages, to change from a random resource selection configuration to a sensing-based resource selection configuration or to allocate V2X dedicated resources. Upon changing the data transmission/reception configuration, the V_UE 23 may stably receive P2V messages, ensuring driver and pedestrian safety.

Figure 3:
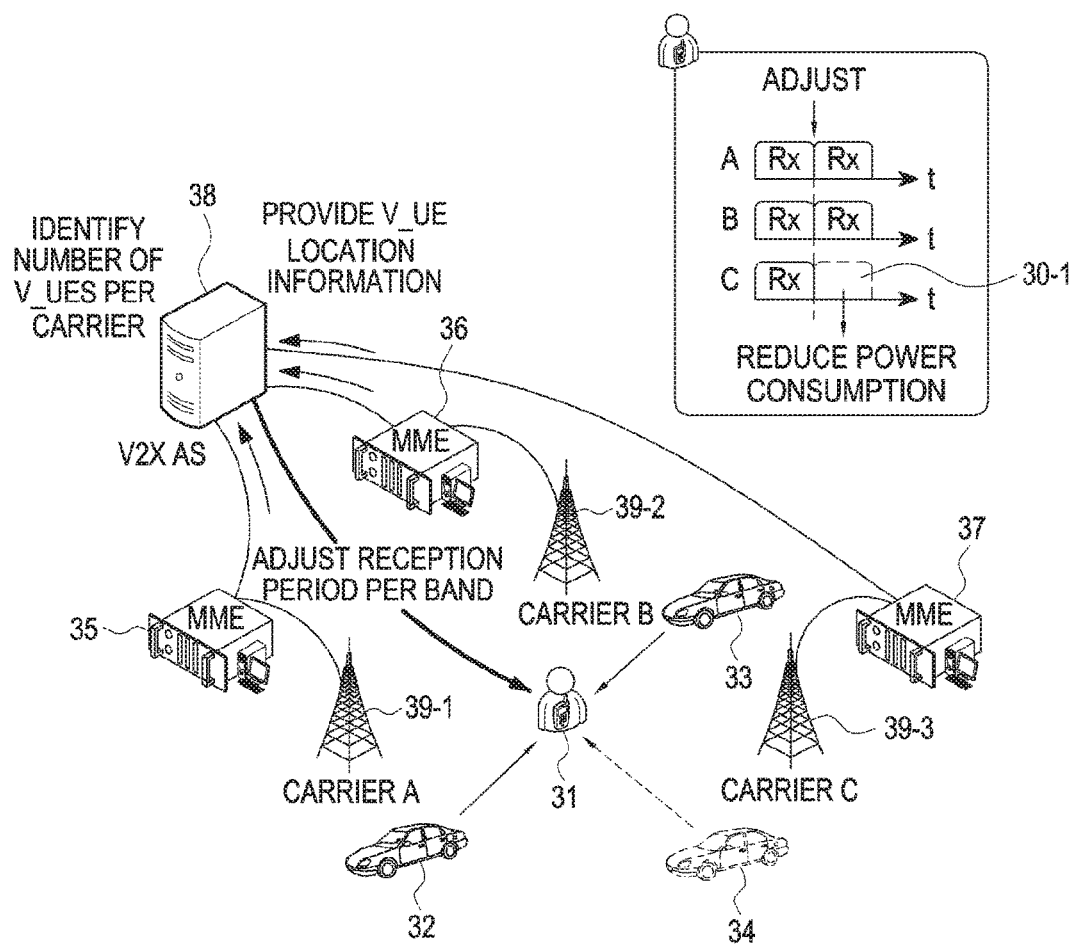
FIG. 3 illustrates a P2V/V2P communication operation scheme according to an embodiment.

FIG. 3 illustrates a P2V/V2P communication operation scheme according to an embodiment.

In FIG. 3, there are multiple communication service providers 39-1 to 39-3. A P_UE 31 may consider the carriers 39-1 to 39-3 that offer services to its neighbor V_UEs 32 to 34. In this case, the P_UE 31 may receive V2P messages in the respective frequency bands of the carriers 39-1 to 39-3. The frequency bands may differ from carrier to carrier.

As an example, the V2X application server (AS) 38 may determine a frequency band reception period for the P_UE 31 by interworking with the MMEs 35 to 37.

To that end, the V2X AS 38 may obtain location information about the V_UEs 32 to 34 from the respective MMEs 35 to 37 of the carriers. In the inter-PLMN environment, the MMEs 35 to 37 may transmit the location information about the V_UEs 32 to 34 to the V2X AS 38, which may identify the number of the respective V_UEs 32 to 34 of the carriers 39-1 to 39-3 located around the P_UE 31 and may then determine per-frequency band reception periods required for the P_UE 31. When the V2X AS 38 sends a request for reception operations as per the determined reception periods to the P_UE 31 through the per-carrier MMEs 35 to 37 or the base stations 39-1 to 39-3, the P_UE 31 may receive V2P messages using a different reception period per frequency band. In this case, the reception period of the P_UE 31 may be set depending on the ambient environment of the P_UE 31. For example, where the P_UE 31 is located in a high-traffic area, the P_UE 31 may be set to have a shorter reception period.

According to the above-described embodiment, the P_UE 31 may save the reception period for the unnecessary carrier band, such as 30-1, reducing power consumption for receiving V2P messages, for better securing driver and pedestrian safety.

Various embodiments in which an eNB recognizes a degradation in the reception rate of a P2V/V2P link are described below in greater detail. Determining a degradation in the P2V/V2P link reception rate presumes that a P_UE is distinguished from a V_UE, such as based on at least one of the media access control (MAC) identity (ID), service ID, and application ID.

Figure 4:
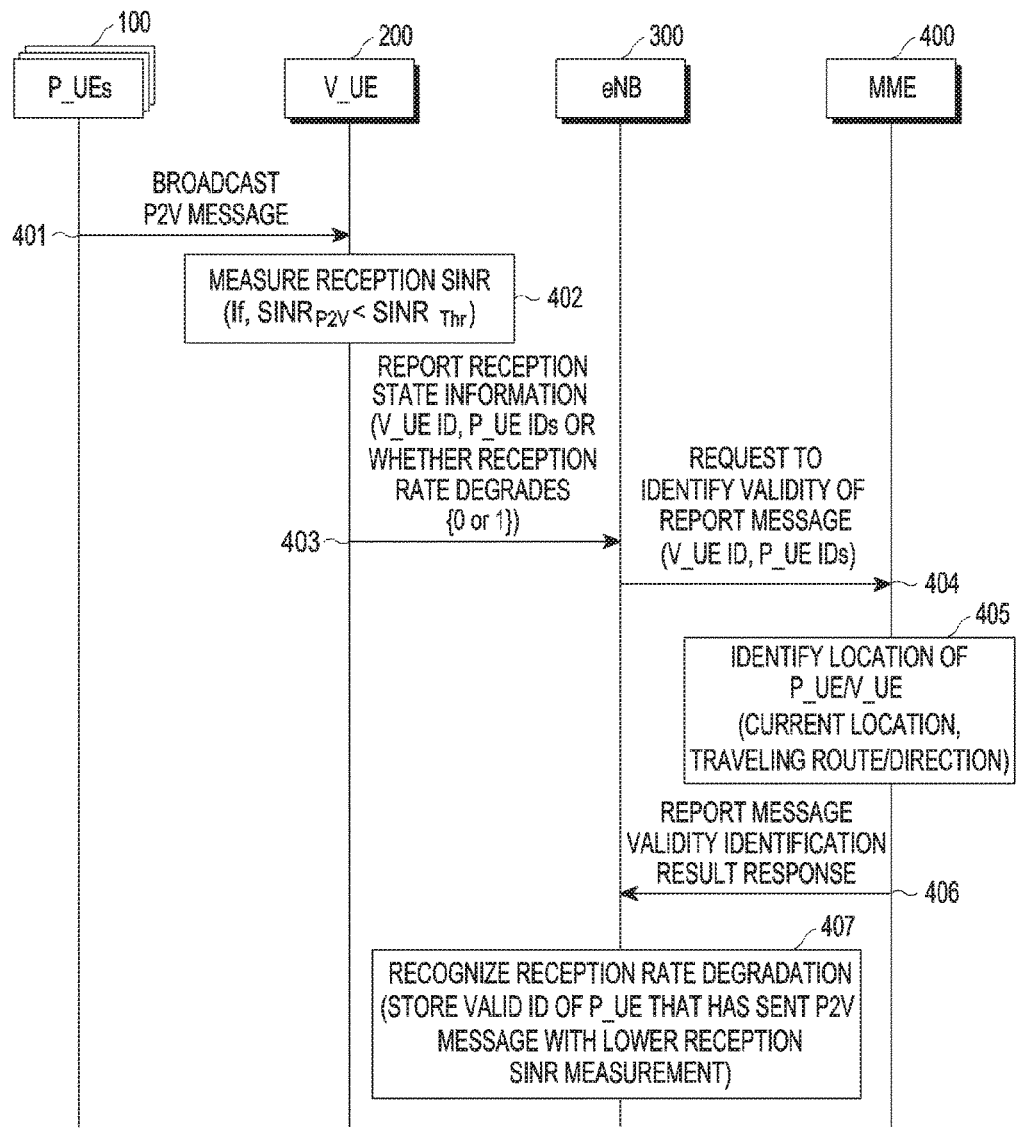
FIG. 4 illustrates a reception rate recognition method according to an embodiment.

FIG. 4 illustrates a reception rate recognition method according to an embodiment.

Referring to FIG. 4, a P_UE 100 broadcasts a P2V message in step 401. In this case, a V_UE 200 measures the reception quality or received signal strength, such as signal-to-interference-plus-noise ratio (SINR) of the P2V message or a channel busy ratio (CBR) for resources that the P_UE 100 uses. The V_UE 200 determines whether the SINR or CBR is a threshold or less in step 402. Where the SINR or CBR measured is the threshold or less, the V_UE 200 transmits a report message containing information about the reception rate for the P2V message to a base station 300 in step 403. As an example, the reception rate information may contain at least one of a V_UE ID and a P_UE ID. As another example, the reception rate information may regard whether a degradation in reception rate occurs, and may be represented as 0 or 1.

The base station 300 transmits a request for identifying the validity of the report message to an MME 400 in step 404. In this case, the MME 400 identifies the locations of the P_UE 100 and the V_UE 200 in step 405 and identifies the validity of the report message in step 406.

For example, where the locations of the P_UE 100 and the V_UE 200 are outside a preset area, as per an absolute standard, or spaced apart from each other by a preset value or more, the MME 400 may determine that the report message is valid, and may determine whether the degradation in reception rate is caused by the increase in distance between the P_UE 100 and the V_UE 200 or by occurrence of a problem with the PC5 sidelink, which may correspond to a D2D link of a D2D communication. The MME 400 transmits a result of identifying the validity of the report message to the base station 300 in step 406. The base station 300 recognizes the degradation in the reception rate based on the result of identification of the validity of the report message and the information about the reception rate. As an example, the base station 300 stores the valid ID of the P_UE that has sent the P2V message with a lower SINR measurement in step 407.

Figure 5:
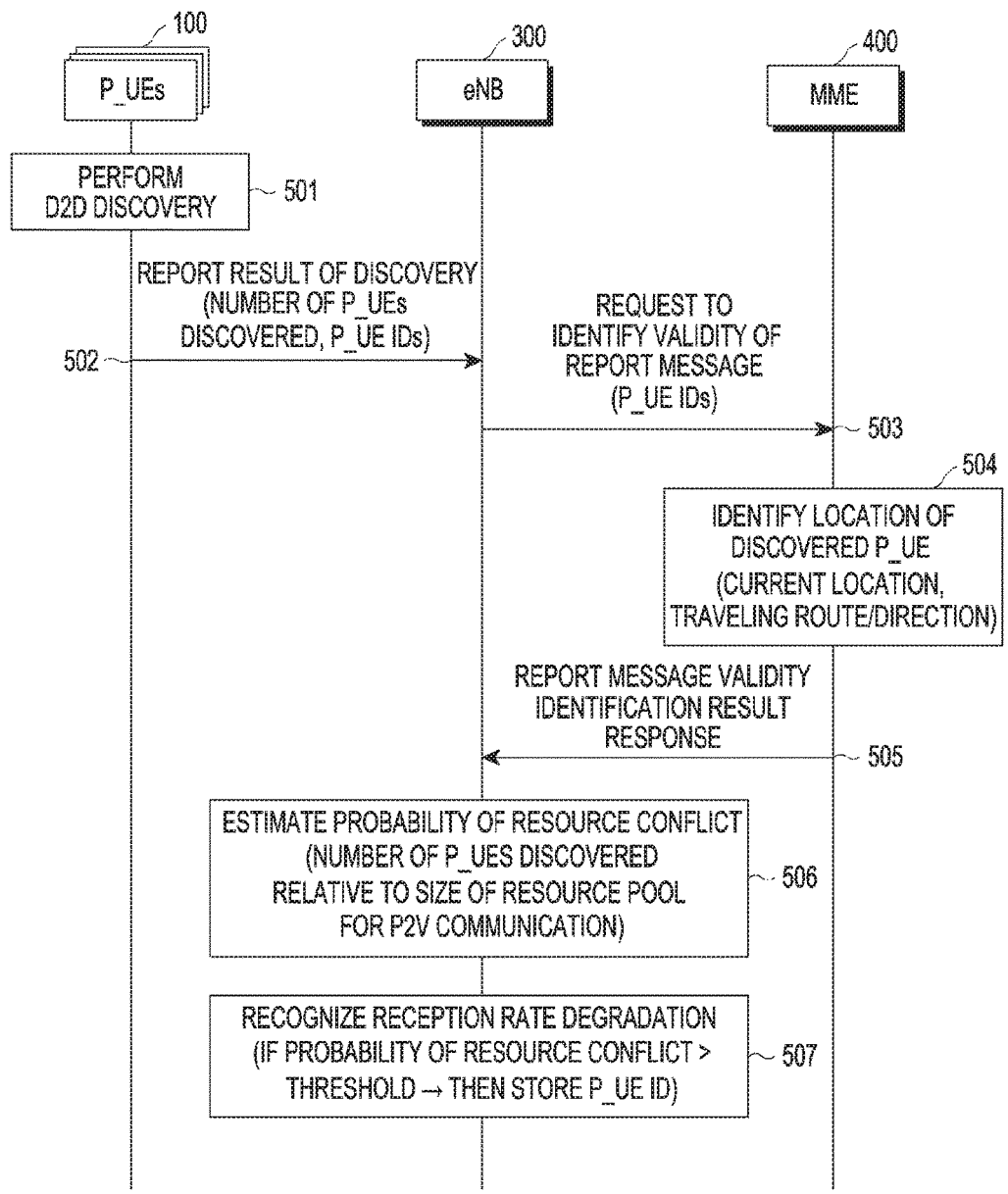
FIG. 5 illustrates a reception rate recognition method according to an embodiment.

FIG. 5 illustrates a reception rate recognition method according to an embodiment.

Referring to FIG. 5, a P_UE 100 periodically performs D2D discovery in step 501. Accordingly, the P_UE 100 reports the number of its ambient P_UEs 100 and P_UE IDs to a base station 200 (discovery result report) in step 502, which sends a request for identifying the validity of the report (report message validity identification request) to an MME 400 in step 503. The report message validity identification request may contain the P_UE IDs. The MME 400 identifies the location of the discovered P_UE 100 and may also determine the traveling direction of the discovered P_UE 100 in step 504. The MME 400 sends a report message validity identification result response to the base station 200 in step 505. The base station 200 may estimate a resource conflict probability based on the discovery result report and the report message validity identification result response in step 506. The resource conflict probability may be the number of P_UEs discovered during the D2D discovery operation relative to the size of the resource pool for P2V communication. Where the resource conflict probability is larger than a preset value, the base station 200 may determine that the reception rate degrades (recognize a degradation in the reception rate) and store the corresponding P_UE ID in step 507.

Figure 6:
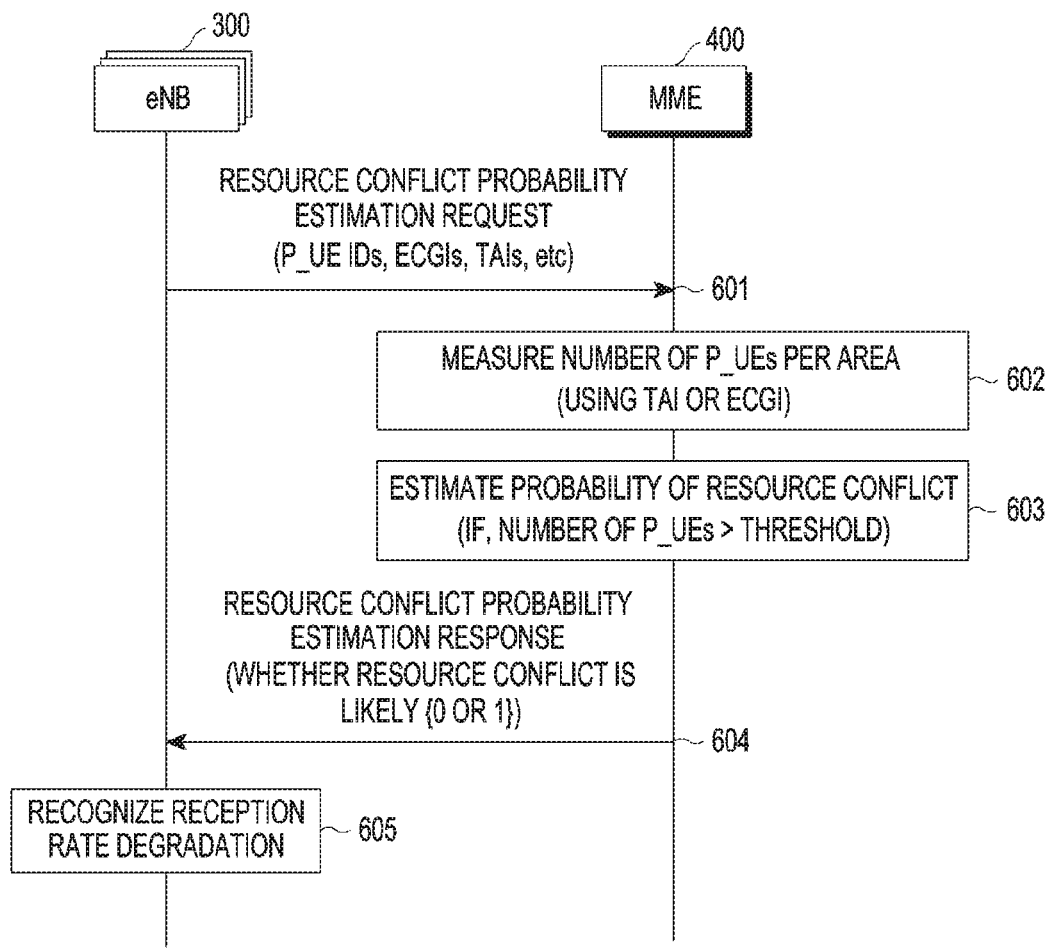
FIG. 6 illustrates a reception rate recognition method according to an embodiment.

FIG. 6 illustrates a reception rate recognition method according to an embodiment.

A P_UE 200 sends a request to estimate the probability of a resource conflict (P_UE IDs, E-UTRAN cell global identifiers (ECGIs), tracking area identities (TAIs), etc.) to the MME 400 in step 601. The MME 400 estimates the number of P_UEs per area based on the location information about the P_UEs 100 in step 602, such as by receiving resource conflict probability estimation requests from a plurality of base stations and estimating the number of multiple per-area P_UEs corresponding to the plurality of base stations. The MME 400 estimates a resource conflict probability. Where the number of the P_UEs in a particular area is more than a preset value, the MME 400 determines that the resource conflict probability is high in step 603, and transmits a resource conflict probability estimation response to the base station in step 604, in which the resource conflict probability may be denoted 0 or 1. Where a resource conflict is likely, such as when the resource conflict probability is denoted 1, as per the resource conflict probability estimation response, the base station 200 may recognize a degradation in the reception rate in step 605.

At least one or more of the methods for recognizing a reception rate described above in connection with FIGS. 4 to 6 may be combined to make such determination. For example, a final determination as to whether the reception rate degrades may be made based on all of the embodiments described above in connection with FIGS. 4 to 6.

In the embodiments described above in connection with FIGS. 4 to 6, upon recognizing a degradation in the reception rate, the base station 200 may vary the data transmission/reception configuration based on case 1 where a degradation in the reception rate of the P2V message is directly determined, or based on case 2 where a degradation in the reception rate of the P2V message is highly likely to be predicted. This is described below in greater detail with FIGS. 7 to 9.

Figure 7:
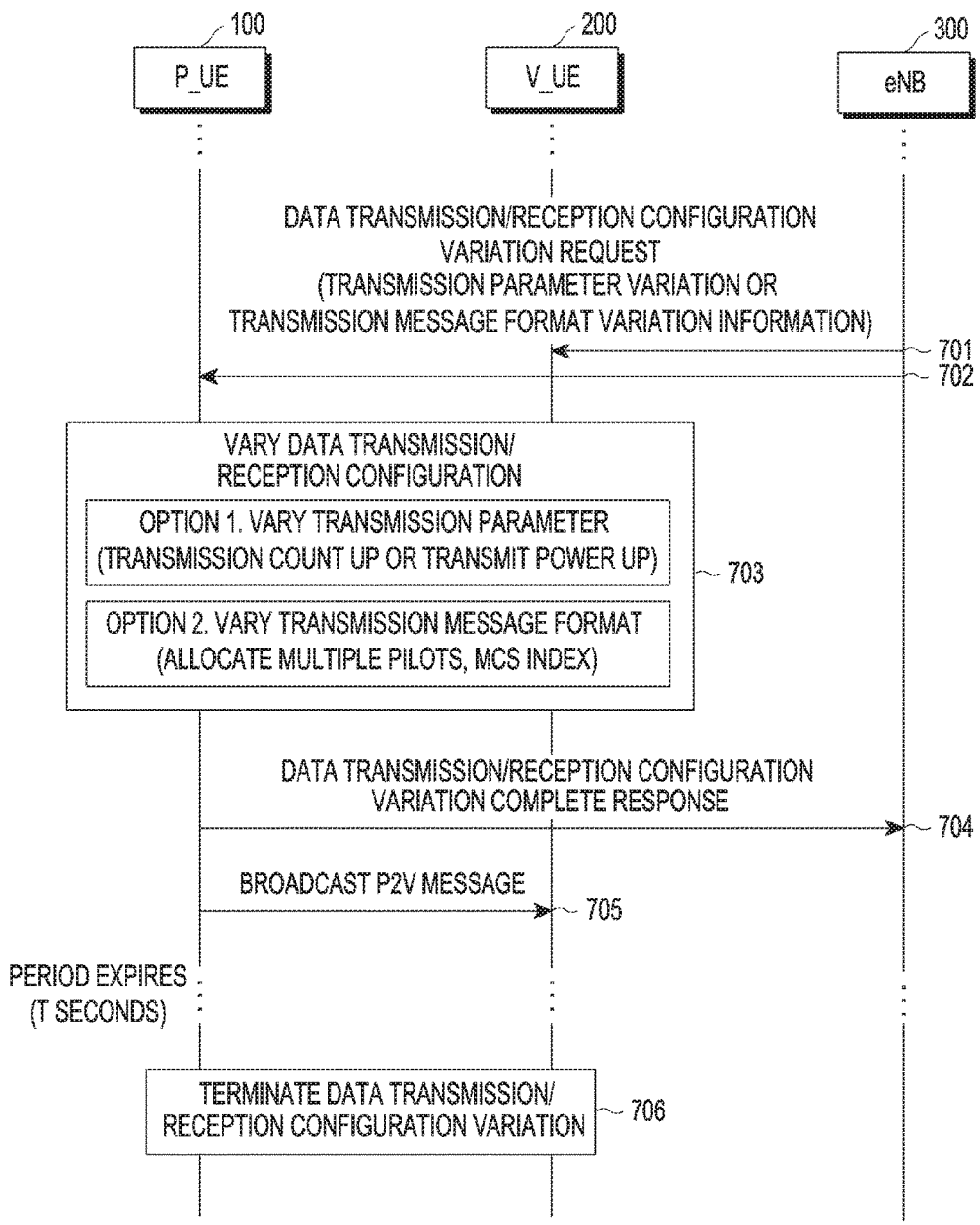
FIG. 7 illustrates a method for varying a data transmission/reception configuration according to an embodiment.

FIG. 7 illustrates a method for varying a data transmission/reception configuration according to an embodiment.

In FIG. 7, a degradation in the reception rate of the P2V message is directly determined.

Referring to FIG. 7, the base station 300 sends a request for varying the data transmission/reception configuration in steps 701 and 702, including transmission parameter variation or transmission message format variation information. The transmission parameter may be the transmit power or transmission count of the P2V message from the P_UE 100. As an example, upon determining that there is a degradation in the reception rate of the P2V message, the P_UE 100 and the V_UE 200 may increase the transmit power or transmission count of the P2V message. The transmission message format variation information may include applying a modulation and coding scheme (MCS) index with a lower signal-to-noise ratio (SNR) as required or applying a message structure to which multiple pilot signals are allocated. The P_UE 100 and the V_UE 200 may vary the data transmission/reception configuration of the P2V message in step 703. As an example, the P_UE 100 and the V_UE 200 may vary the transmission parameter or the transmission message format. The P_UE 100 and the V_UE 200 may transmit a data transmission/reception configuration variation complete response to the base station 300 in step 704. The P_UE 100 broadcasts a P2V message based on the varied data transmission/reception configuration in step 705. After a preset time (T sec), the P_UE 100 and the V_UE 200 terminate the data transmission/reception configuration variation in step 706.

Figure 8:
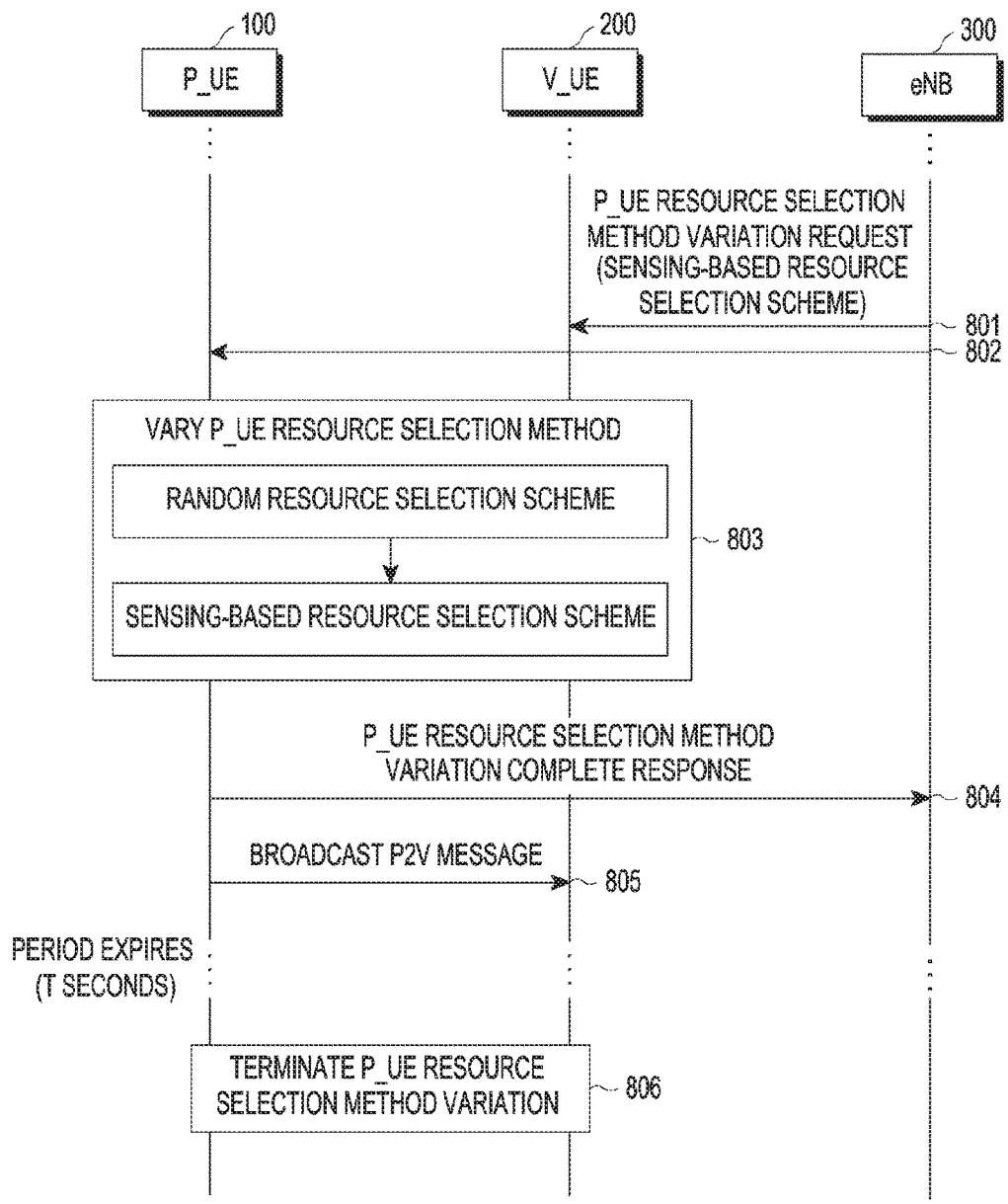
FIG. 8 illustrates a method for varying a data transmission/reception configuration according to an embodiment.

FIG. 8 illustrates a method for varying a data transmission/reception configuration according to an embodiment.

In FIG. 8, a degradation in the reception rate of the P2V message is predicted as per a high resource conflict probability.

Referring to FIG. 8, the base station 300 transmits P_UE resource selection method variation requests to the P_UE 100 and the V_UE 200 in steps 801 and 802. The P_UE resource selection method variation request may include a request for switching to a sensing-based resource selection scheme. The P_UE 100 and the V_UE 200 may vary the P_UE resource selection method in step 803, such as by changing the current P_UE resource selection method from a random resource selection scheme to a sensing-based resource selection scheme of identifying available resources and using the identified resources. The P_UE 100 may transmit a P_UE resource selection method variation complete response to the base station 300 in step 804. The P_UE 100 may broadcast a P2V message in step 805. After a preset time (T sec), the P_UE terminates the P_UE resource selection method variation in step 806.

Figure 9:
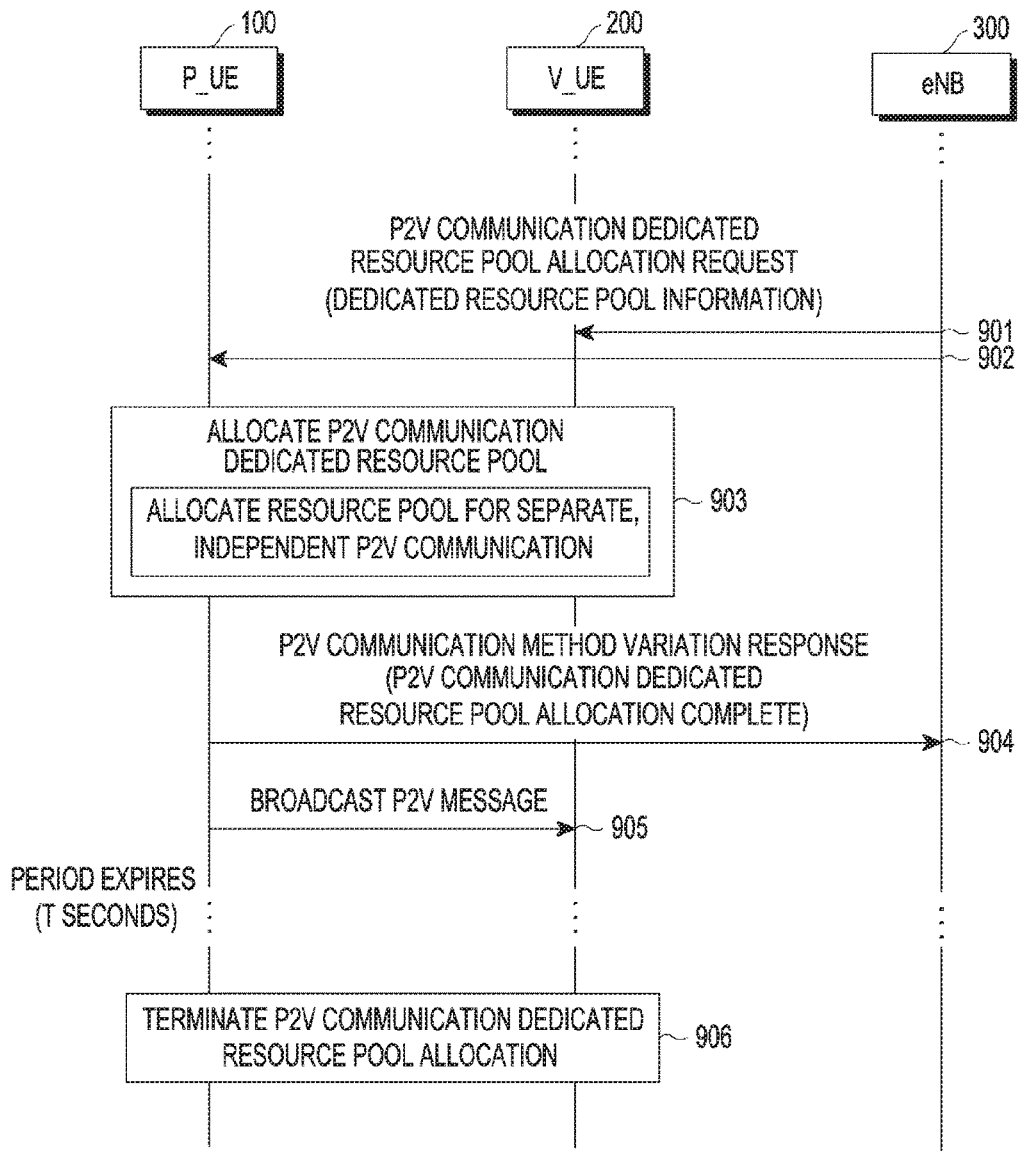
FIG. 9 illustrates a method for varying a data transmission/reception configuration according to an embodiment.

FIG. 9 illustrates a method for varying a data transmission/reception configuration according to an embodiment.

In FIG. 9, a degradation in the reception rate of the P2V message is predicted as per a high resource conflict probability.

Referring to FIG. 9, the base station 300 transmits P2V communication dedicated resource pool allocation requests to the P_UE 100 and the V_UE 200 in steps 901 and 902. The P2V communication dedicated resource pool allocation request may contain dedicated resource pool information. The P_UE 100 and the V_UE 200 may allocate a P2V communication dedicated resource pool in step 903. In this case, the P_UE 100 and the V_UE 200 may allocate a separate, independent P2V communication resource pool. The P_UE 100 may transmit a P2V communication method variation response (P2V communication dedicated resource pool allocation complete) to the base station 300 in step 904. The P_UE 100 may broadcast a P2V message in step 905. After a preset time (T sec), the P_UE terminates the P_UE resource selection method variation in step 906. Thus, the P2V resource conflict probability may be reduced, and the P2V service may stably be provided.

Although the embodiment of FIG. 7 may be operated limited to the in-coverage circumstance, the embodiments of FIG. 8 and FIG. 9 may be operated in the out-coverage circumstance as well. That is, in the embodiments described with reference to FIGS. 8 and 9, upon recognizing a degradation in the reception rate, the P_UEs 100 and 200 may change their communication methods as per their own rules without reporting to the base station 300.

At least one or more of the methods for varying the data transmission/reception configuration described above in connection with FIGS. 7 to 9 may be combined together. For example, the methods for varying the data transmission/reception configuration according to the embodiments of FIGS. 7 and 8 may be applicable as a single embodiment.

Meanwhile, such a method may be considered to save the reception periods for unnecessary carrier frequency bands given the carrier of the V_UEs located near the P_UE for stable data communication, which is described in detail with reference to FIGS. 10 and 11.

Figure 10:
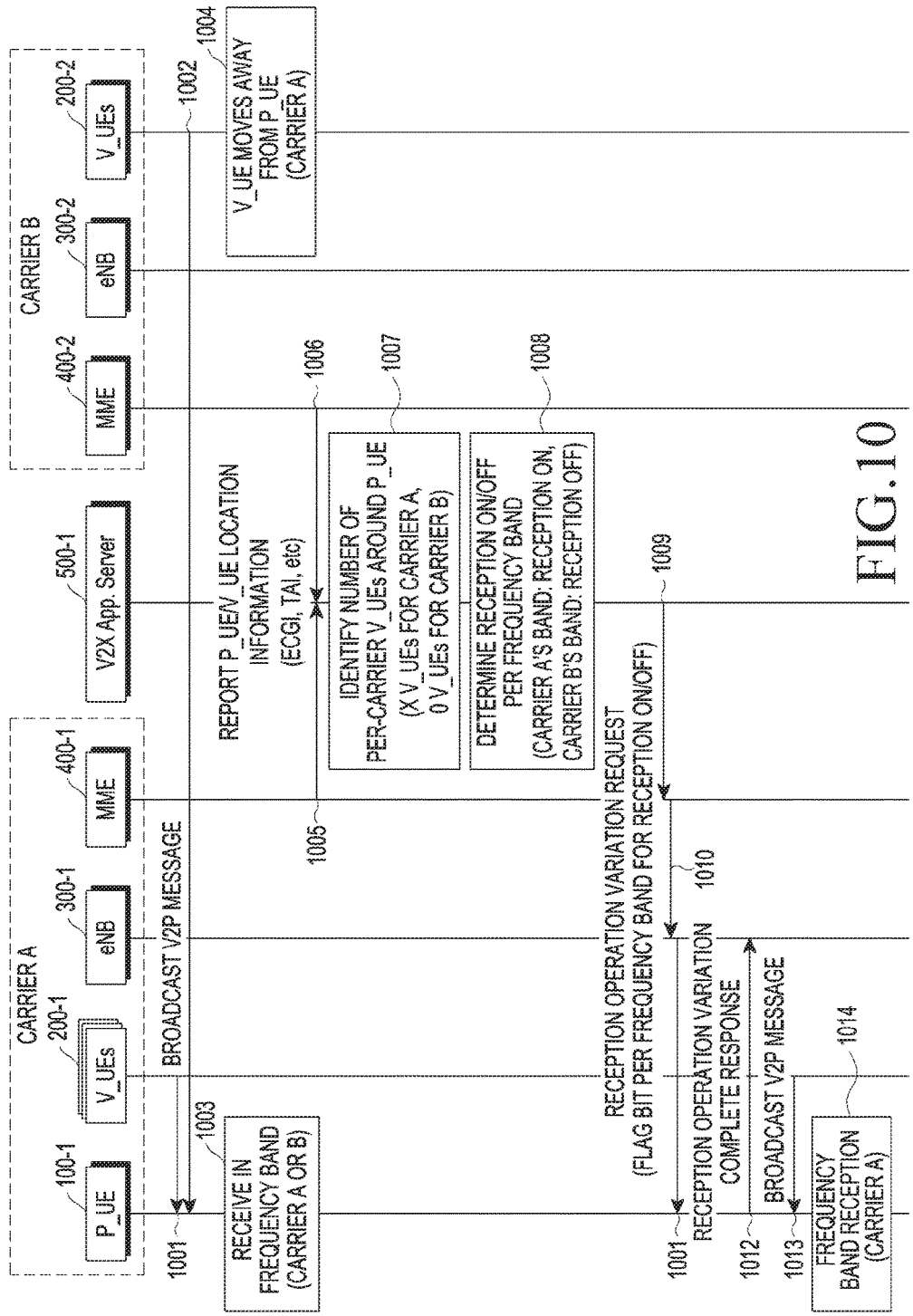
FIG. 10 illustrates a method for reducing a reception period in a frequency band according to an embodiment.

FIG. 10 illustrates a method for reducing a reception period in a frequency band according to an embodiment.

Referring to FIG. 10, a P_UE 100-1, V_UEs 200-1, an eNB 300-1, and an MME 400-1 are related to carrier A, and V_UEs 200-2, an eNB 300-2, and an MME 400-2 are related to carrier B.

Referring to FIG. 10, the V_UEs 200-1 and 200-2 broadcast V2P messages in steps 1001 and 1002. The P_UE 100-1 receives the V2P messages in different frequency bands corresponding to carriers A and B in step 1003. It is assumed that at least one of the V_UEs moves away from the P_UE 100-1 in step 1004. In this case, a V2X App Server 500-1 receives reports (ECGI, TAI, etc.) about P_UE/V_UE (100-1, 100-2, 200-2, and 200-2) location information from the MMES 400-1 and 400-2 in steps 1005 and 1006. The V2X App Server 500-1 identifies the number of the per-carrier V_UEs around the P_UE 100-1 in step 1007, and determines the reception ON/OFF for each frequency band in step 1008. As an example, the V2X App Server 500-1 may turn on the reception on carrier A's frequency band and turn off the reception in carrier B's frequency band.

The V2X App Server 500-1 transmits a reception operation variation request (including a flag bit per frequency band for reception ON/OFF) to the P_UE 100-1 in steps 1009, 1010 and 1011. The P_UE 100-1 transmits a reception operation variation complete response to the base station 300-1 in step 1012. The V_UEs 200-1 broadcast V2P messages in step 1013. The P_UE 100-1 receives the V2P message in carrier A's frequency band in step 1014.

Figure 11:
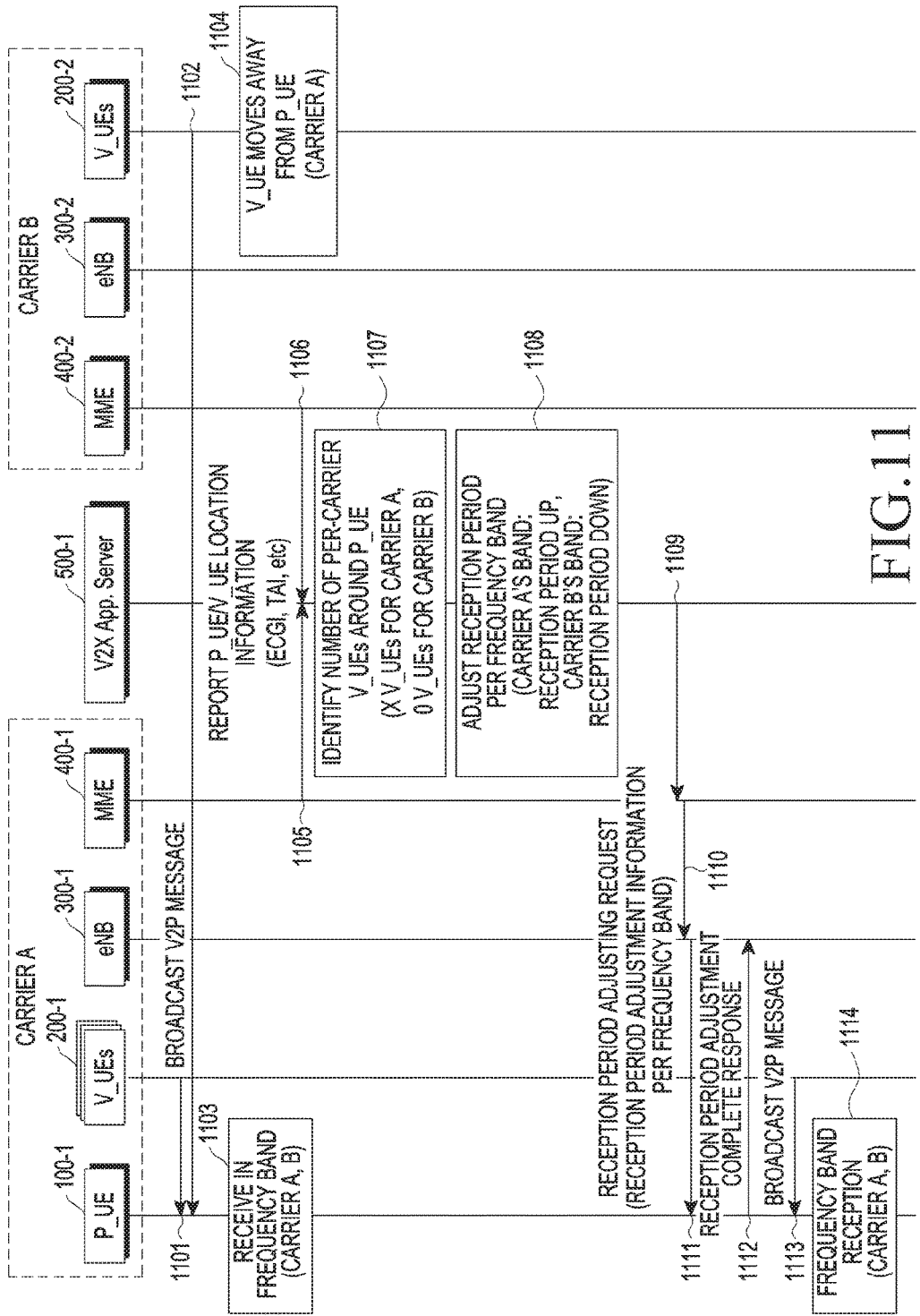
FIG. 11 illustrates a method for reducing a reception period in a frequency band according to an embodiment.

FIG. 11 illustrates a method for reducing a reception period in a frequency band according to an embodiment.

Referring to FIG. 11, a P_UE 100-1, V_UEs 200-1, an eNB 300-1, and an MME 400-1 are related to carrier A, and V_UEs 200-2, an eNB 300-2, and an MME 400-2 are related to carrier B.

Referring to FIG. 11, the V_UEs 200-1 and 200-2 broadcast V2P messages in steps 1101 and 1102. The P_UE 100-1 receives the V2P messages in different frequency bands corresponding to carriers A and B in step 1103. It is assumed that the V_UEs (or V_UE) 200-2 move away from the P_UE 100-1 in step 1104. In this case, a V2X App Server 500-1 receives reports, such as E-UTRAN Cell Global Identifier (ECGI) or tracking area identity (TAI), about P_UE/V_UE (100-1, 100-2, 200-2, and 200-2) location information from the MMEs 400-1 and 400-2 in steps 1105 and 1106. The V2X App Server 500-1 identifies the number of the per-carrier V_UEs around the P_UE 100-1 in step 1107. The V2X App Server 500-1 determines to adjust the reception period for each frequency band in step 1108, such as by increasing the reception period for carrier A's frequency band while reducing the reception period for carrier B's frequency band. The V2X App Server 500-1 transmits a reception period variation request (including reception period adjusting information per frequency band) to the P_UE 100-1 in steps 1109, 1110 and 1111. The P_UE 100-1 transmits a reception operation variation complete response to the base station 300-1 in step 1112. The V_UEs 200-1 broadcast V2P messages in step 1113. The P_UE 100-1 receives the V2P messages in the frequency bands of carriers A and B in step 1114. The reception period for carrier A's frequency band may be increased, and the reception period for carrier B's frequency band may be decreased.

Figure 12:
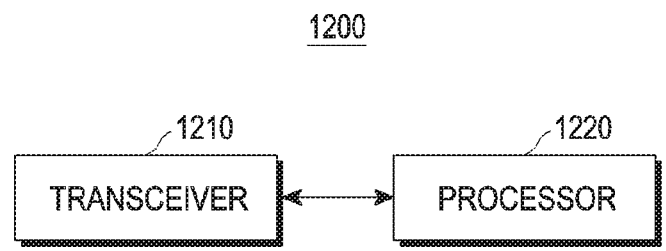
FIG. 12 is a block diagram illustrating a base station according to an embodiment.

FIG. 12 is a block diagram illustrating a base station 1200 according to an embodiment.

Referring to FIG. 12, a base station 1200 includes a transceiver 1210 and a processor 1220.

The transceiver 1210 may receive information about the reception rate of a signal from a second UE performing D2D communication with a first UE and receive location information about at least one of the first UE and the second UE.

The processor 1220 controls the base station 1200 as per at least one of the embodiments described above in connection with FIGS. 1 to 11 and FIGS. 14 to 16 described below. As an example, the processor 1220 may determine a data transmission/reception configuration for D2D communication based on the reception rate information and location information and control the transceiver 1210 to transmit the determined data transmission/reception configuration to at least one of the first UE and the second UE.

Specifically, the processor 1220 may determine the received signal strength based on the reception rate information, determine the distance between the first UE and the second UE based on the location information, and determine the data transmission/reception configuration for D2D communication based on the received signal strength and distance.

The processor 1220 may control the transceiver 1210 to further receive information about the number of UEs located within a preset distance of the first UE from the first UE and may determine a data transmission/reception configuration for D2D communication further considering the information about the number of the UEs.

The determined data transmission/reception configuration may be one of a configuration to increase transmit power or a configuration to increase the transmission rate. The determined data transmission/reception configuration may be a sensing-based resource selection scheme.

For D2D communication, e.g., P2V/V2P communication, the vehicle may require a scheme to differentiate its passengers from pedestrians, or to differentiate between the passengers and pedestrians and provide different services such as safety information to the passengers and the pedestrians. Such schemes are described below in detail. Hereinafter, communication between vehicle and passenger is denoted vehicle-to-passenger (V2Pa), and communication between vehicle and pedestrian is denoted V2Pe to avoid confusion from V2P.

Figure 13:
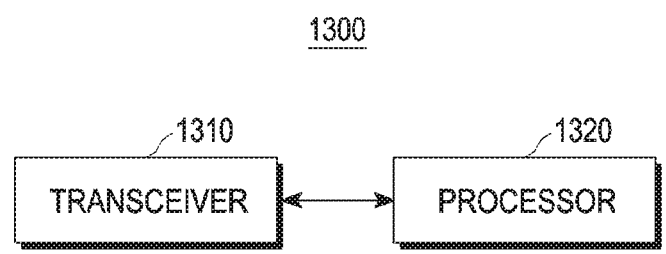
FIG. 13 is a block diagram illustrating a terminal according to an embodiment.

FIG. 13 is a block diagram illustrating a terminal according to an embodiment.

Referring to FIG. 13, a UE 1300 includes a transceiver 1310 and a processor 1320.

The transceiver 1310 communicates data with a first UE or a base station.

Figure 14:
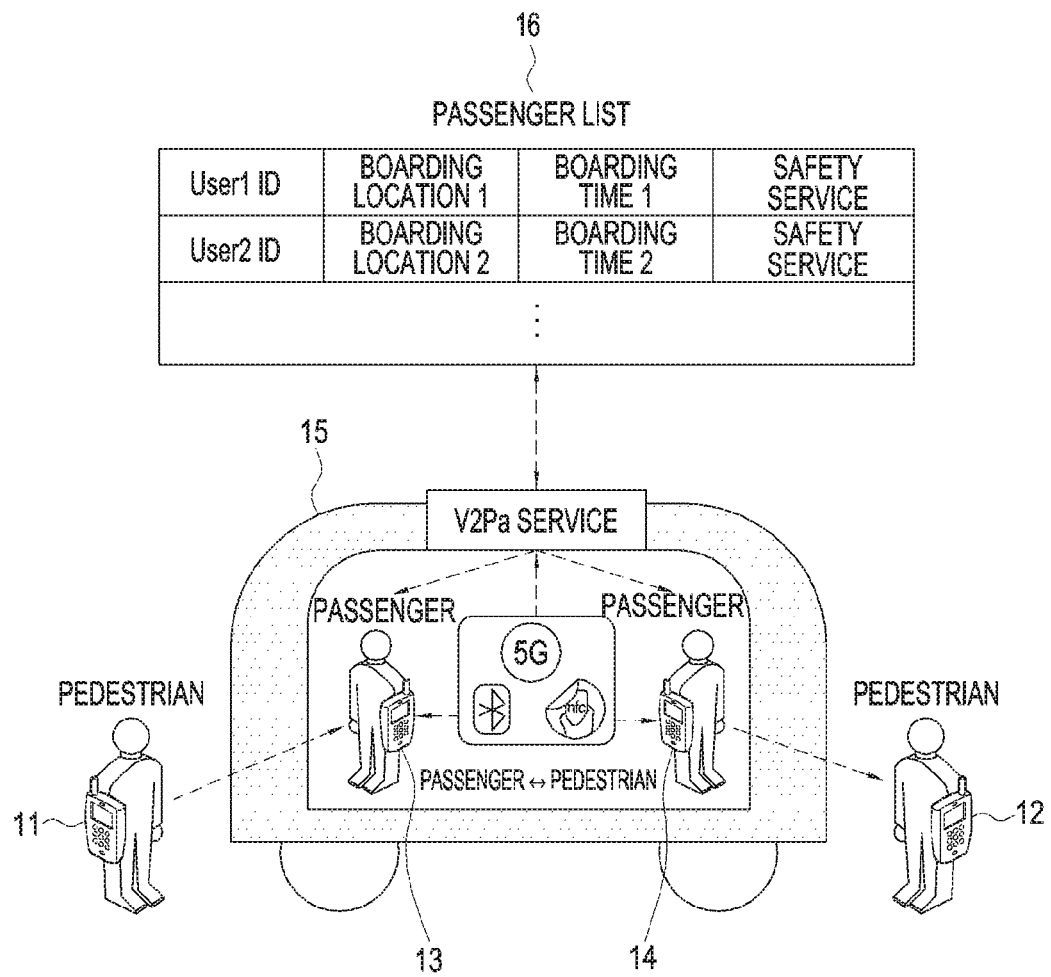
FIG. 14 illustrates a vehicle-to-passenger (V2Pa) service system according to an embodiment.
Figure 15:
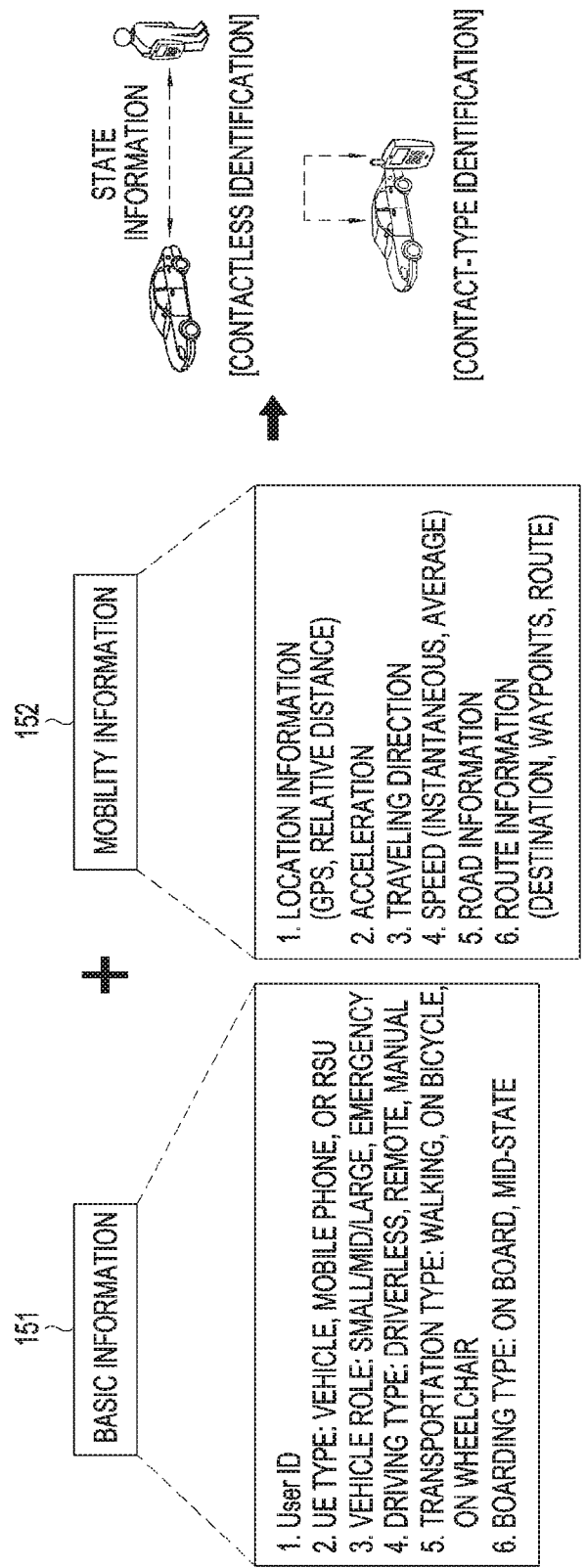
FIG. 15 illustrates a passenger/pedestrian identification method according to an embodiment.

The processor 1320 controls the UE 1300 as per at least one of the embodiments described above in connection with FIGS. 1 to 11 and the following FIGS. 14 to 16. The processor 1320 may transmit information about a reception rate of a signal generated based on a signal received from the first UE, receive a data transmission/reception configuration for D2D communication determined based on location information about at least one of the first UE and the UE 1300 and the reception rate information, and control the transceiver 1310 to perform data transmission/reception with the first UE based on the data transmission/reception configuration.

The data transmission/reception configuration may be determined based on the distance between the first UE and the UE 1300, the location information and the received signal strength, and the reception rate information.

The data transmission/reception configuration may be determined further considering information about the number of UEs located within a preset distance of the first UE.

The data transmission/reception configuration may be one of increasing transmit power and increasing the transmission rate.

The data transmission/reception configuration may be a sensing-based resource selection scheme.

FIG. 14 illustrates a V2Pa service system according to an embodiment.

The V2Pa service system enables a smooth switch between passenger and pedestrian.

As an example, where pedestrians 11 and 12 enter a vehicle 15, the pedestrians may be switched and recorded as passengers 13 and 14. Conversely, where pedestrians 13 and 14 exit the vehicle 15, they may be switched and recorded as pedestrians 11 and 12.

As an example, the V2Pa service may create a passenger list 16 that is recorded in the items of user ID, boarding location, boarding time, and safety service. In this case, the V2Pa service may update the current state (whether pedestrians or passengers) as per switching between the pedestrians 11 and 12 and the passengers 13 and 14.

FIG. 15 illustrates a passenger/pedestrian identification method according to an embodiment.

Referring to FIG. 15, passenger/pedestrian identification may be performed based on state messages from the passenger/pedestrian UEs and the vehicle UE. The state message may contain basic information 151 and mobility information 152. The basic information 151 may include at least one of user or UE ID, UE type, such as vehicle, mobile phone, or road side unit (RSU), vehicle role, such as small/mid/large, or emergency, driving type, such as driverless, remote, or manual, transportation type, such as walking, on a bicycle, or in a wheel chair, and boarding type, such as on-board or mid-state). The mobility information 152 may include at least one of location information, such as global positioning system (GPS) or relative distance, acceleration, traveling direction, speed (instantaneous or average), road information, and route information, such as destination, waypoints, or route. The route information may be utilized to set up an optimal route according to the passengers'/pedestrians' requirements for the destination. In this case, the passengers/pedestrians may effectively receive necessary advertisements and news according to the traveling route.

The passenger/pedestrian UE and the vehicle UE may determine whether they are on-board using their respective received particular information, e.g., the basic information 151 and the mobility information 152. The passenger/pedestrian identification methods may be a contactless and contact-type identification method. The contactless identification method is a method in which state information is delivered between vehicle and UE within a pedestrian distance using wireless communication, and the contact-type identification method is a method in which relevant information or messages are delivered via short-range communication or wired communication within a preset distance, such as a few centimeters. The contactless identification method and the contact-type identification method may be applied independently or complementarily depending on the use of the vehicle, number of passengers, and communication environments.

Figure 16A:
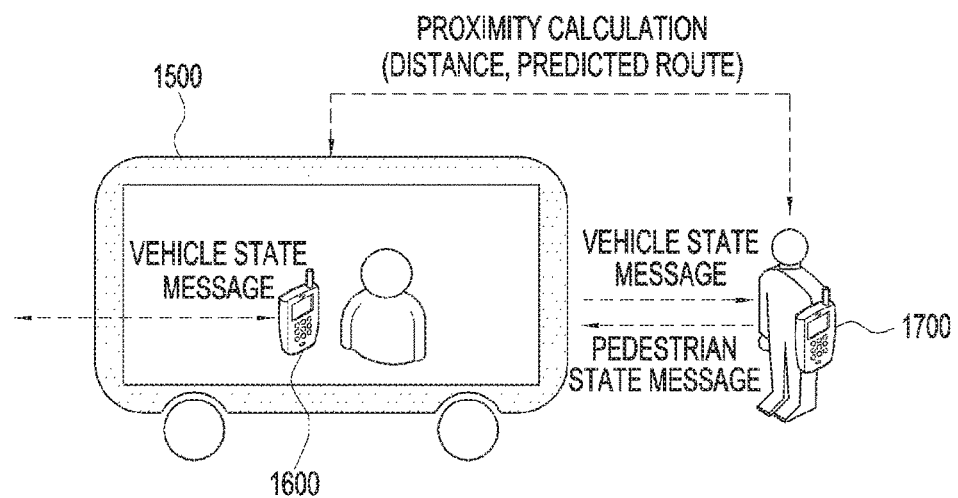
FIGS. 16A and 16B illustrate a contactless identification method according to an embodiment.
Figure 16B:
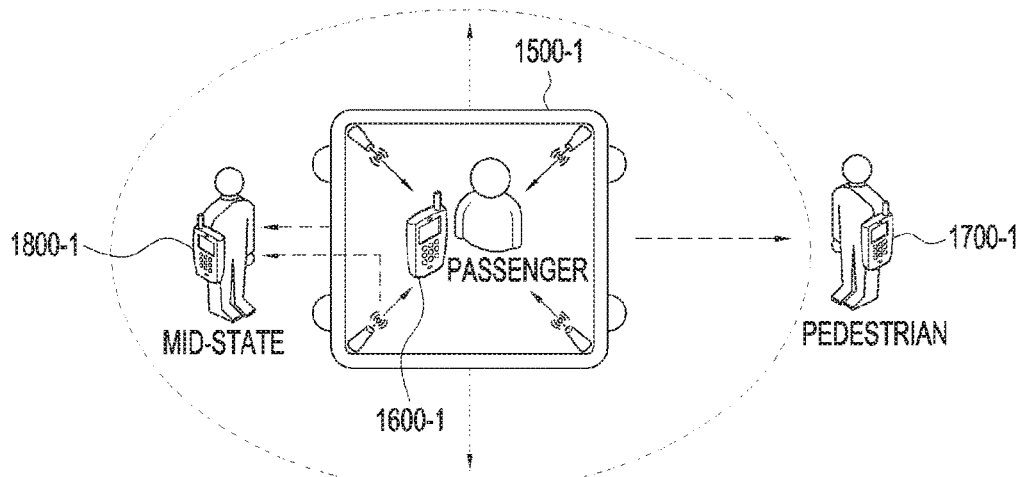

FIGS. 16A and 16B illustrate a contactless identification method according to an embodiment.

The contactless identification method identifies the passenger/pedestrian through wireless communication devices such as of V2X communication and long-range radio-frequency identification (RFID). The passenger/pedestrian state identification may automatically be performed even without performing a separate operation on the passenger/pedestrian UEs 1600 and 1700 and/or the vehicle UE 1500. The contactless passenger/pedestrian identification method may be implemented as one using V2X state messages as shown in FIG. 16A or another embodiment using beacons as shown in FIG. 16B. The beacons may be those of wireless communication technology (e.g., Bluetooth or long range radio frequency identifier (RFID)) capable of automatically recognizing a smart device and transmitting data.

Referring to FIG. 16A, in the method using V2X state messages, the passenger/pedestrian is identified using information in the state messages periodically transmitted from each passenger/pedestrian UE 1600 and 1700 to provide V2X services. The vehicle UE 1500 may calculate the proximity of the vehicle UE 1500 and the passenger/pedestrian UE 1600 and 1700 using the mobility information of the passenger/pedestrian 1600 and 1700 in the state message.

As examples of the V2X state message, a cooperative awareness message (CAM) and a basic safety message (BSM) as disclosed by ETSI and SAE may be used. However, these standards are limiting in supporting V2Pa services due to a lack of any passenger stage-related message. Thus, a vehicle basic information message (VBIM) is disclosed herein for providing passenger state information, as described below in detail with reference to FIG. 17.

Figure 17A:
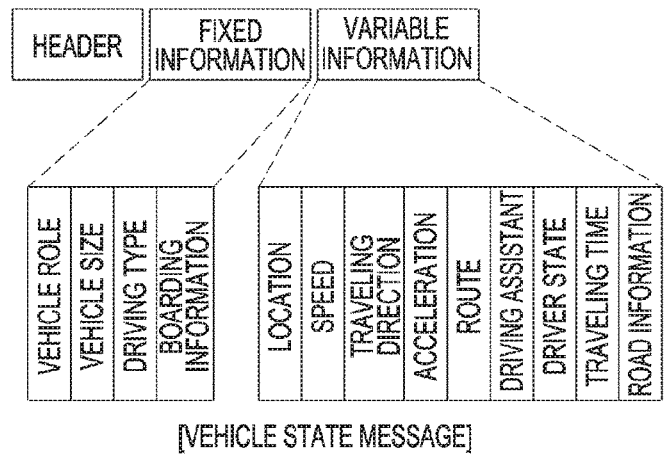
FIGS. 17A, 17B, and 17C illustrate a structure of a VBIM according to an embodiment.
Figure 17B:
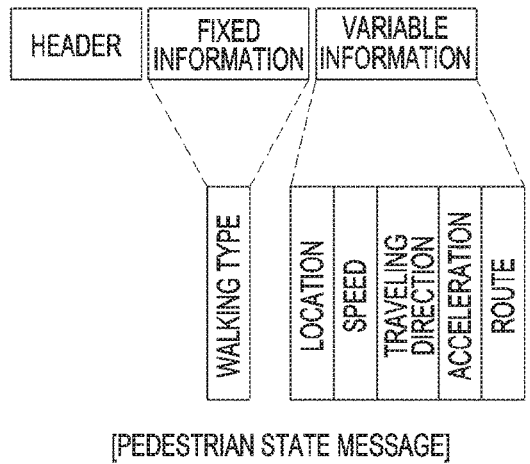
Figure 17C:
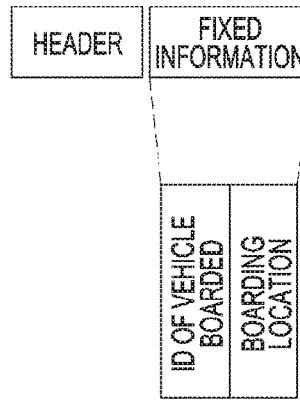

FIGS. 17A, 17B, and 17C illustrate a structure of a VBIM according to an embodiment.

A VBIM may be used to differentiate between passengers and pedestrians and may include a vehicle state message as shown in FIG. 17A, a pedestrian state message as shown in FIG. 17B, and a passenger state message as shown in FIG. 17C. The structure of the VBIM is configured to add necessary information depending on targets and new services based on the CAM and BSM structures as well known in the art, and thus, no detailed description thereof is given.

The vehicle state message of the VBIM structure, as compared with the CAM and BSM structures, adds driving type (manual/automated/driverless), boarding information (whether there is passenger/pedestrian), driving time, driver information, and road information (road condition) to be on par with expanding driving techniques and services. Additional boarding information such as vehicle ID and boarding location is newly disclosed in the passenger state message. Since the passenger mobility information and state information are similar to that in the vehicles, the passenger mobility and state information obtain the state information through the ID of the vehicle on which they are installed and the corresponding vehicle state message.

FIG. 16B illustrates an identification method using beacons among contactless identification methods according to an embodiment.

To implement a beacon-based identification method, beacons are installed inside or outside the vehicle. The beacons transmit different signals and may include a wireless communication device such as of RFID or Bluetooth. As an example, an RFID may be a long-range RFID enabling a UE to recognize another UE on its own and transmits data within a few meters.

Passenger/pedestrian UEs 1600-1 and 1700-1 identify the states of the passenger and the pedestrian according to whether beacon signals are received and the order of reception and then deliver the identified statuses to the vehicle. As an example, in the passenger identification method, where beacon signals are received in the order from the outside to the inside, the state of the pedestrian UE 1700-1 switches from pedestrian to passenger. Conversely, when beacon signals are received in reverse order, the passenger UE 1600-1 switches from passenger to pedestrian.

As an example, the pedestrian UE may simultaneously receive external signals from multiple vehicles, in which problematic case the signals should be classified to screen signals from the vehicle to be boarded. At this time, the pedestrian UE screens the vehicle to be boarded by sending a request for screening the vehicle to be boarded or the others to be disregarded to the pedestrian or comparing the receive power strengths of the external signals. The pedestrian UE may select k vehicles that transmit high levels of power and identify whether internal signals are received from the vehicle of priority during a pedestrian time. Upon failing to receive any internal signal, the pedestrian UE again receives external signals from the ambient vehicles.

Unlike the pedestrian, upon receiving multiple external signals in the vehicle, the passenger disregards the signals or sends an inquiry as to whether to change vehicles or states to the user of the UE. Both the passenger and the pedestrian may receive multiple internal and external signals inside or outside the vehicle.

Figure 18:
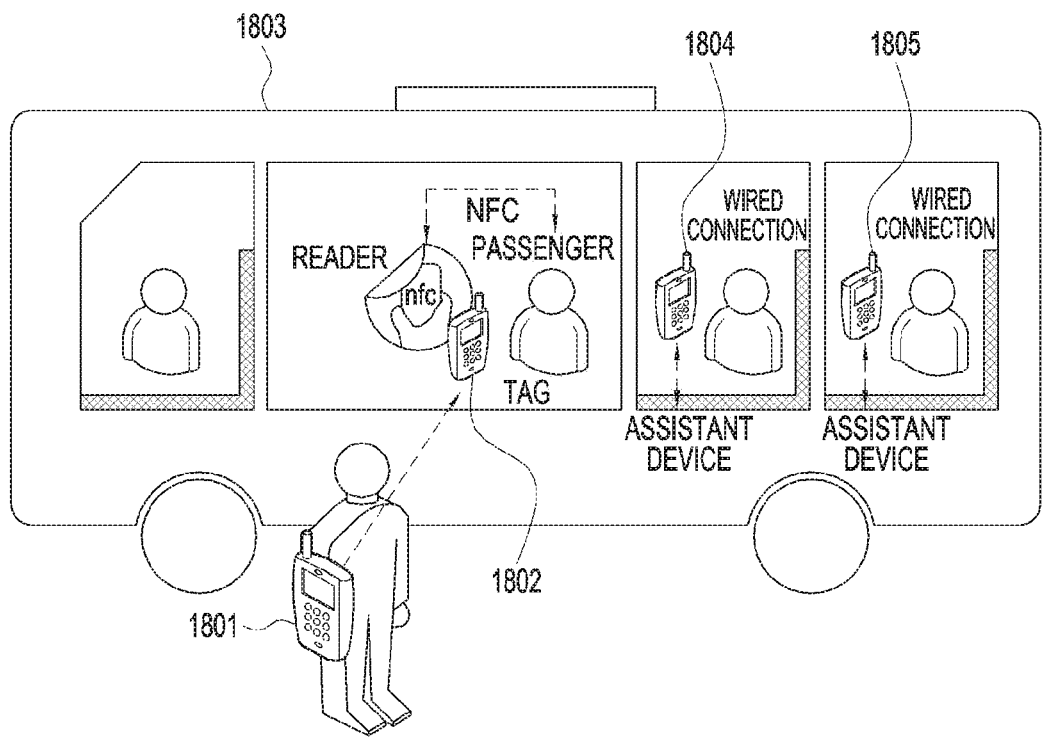
FIG. 18 illustrates a contact-type identification method according to an embodiment.

FIG. 18 illustrates a contact-type identification method according to an embodiment.

In the contact-type identification method in FIG. 18, state information is delivered with the passenger/pedestrian UE contacting an assistant device, and it is determined whether the subject is the passenger UE 1801 or the pedestrian UE 1802. 'Contacting" may indicate a wired connection between the passenger/pedestrian UE 1801 or 1802 and the vehicle UE 1803 or proximate communication within a preset distance therebetween.

An example of the contact-type identification method is an identification method using short-range communication. In the short-range communication-adopted method, the passenger/pedestrian UE 1801 or 1802 approaches within a few centimeters of an identification device of the vehicle UE 1803 and delivers state information, thereby performing identification. As an example, near-field communication (NFC) may be adopted as the short-range communication and enables transfer of state information within a short range of 10 cm or less. As another example, the passenger identification method through wired connection may adopt a universal serial bus (USB) scheme, in which case a cable may be wired between the vehicle UE 1830 and the passenger UE 1802, 1804, or 1805. Accordingly, the state information may be transferred via the cable. The contact-type identification method is not limited to the NFC and USB schemes.

Methods of identifying a user terminal (or a personal terminal) as a passenger UE, a pedestrian UE, or a mid-state UE have been described above in connection with the embodiments.

The pedestrian UE broadcasts or receives V2X state messages and service messages. The user can block the corresponding message by directly setting on the UE when the user does not desire a particular UE or service.

The passenger UEs basically form a group among the passengers and provide services. Each passenger UE may communicate with UEs outside the group as well as the other group members and the vehicle. The passenger group may select the passenger group management server of the vehicle or a leader UE to support services and control communication. The group members may send a request for V2Pa services to the application server or receive support through the vehicle's own server or leader UE. The vehicle's server and the leader UE may play a role to block driving safety-related services or alerting blind spots which are unnecessary to the group members.

In the mid-state, it is unclear whether to discern between passengers and pedestrians. In the contactless identification method, a switch to the mid-state may occur when signals are received at a lowered reception rate or several signals are simultaneously received.

In the contact-type identification method, an error in the state information may cause a reversion to the mid-state, in which it is unclear whether to differentiate between passengers and pedestrians. Thus, an accident is more likely to occur, and a separate operation may be performed. First, the mid-state UE notifies the vehicle of its state switch and request the vehicle to restrict its movement, such as decelerating or coming to a stop. The mid-state UE may also receive all V2X services related to the passengers and the pedestrians until the state is clearly identified. Unless identification is not attained through an additional state message or assistant device, the mid-state UE may directly inquire the user about the current state.

Figure 19:
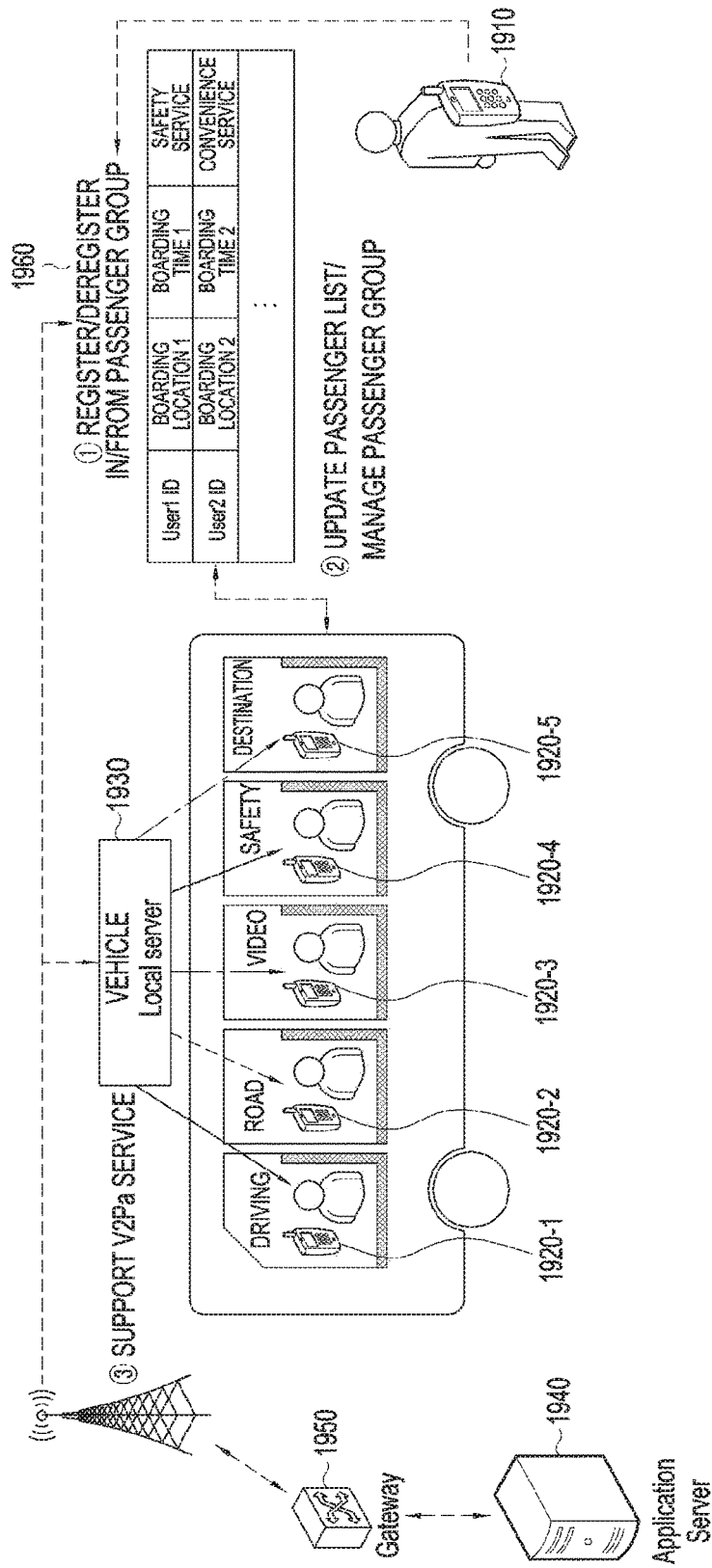
FIG. 19 illustrates a V2Pa service supporting method according to an embodiment.

FIG. 19 illustrates a V2Pa service supporting method according to an embodiment.

Referring to FIG. 19, a V2Pa service supporting method is described under the assumption that passenger UEs and pedestrian UEs have been identified.

A vehicle UE 1910 may manage state information about a plurality of passenger UEs 1920-1 to 1920-5 to support different services for the plurality of passenger UEs 1920-1 to 1920-5. As an example, the vehicle UE 1910 may form a group of the plurality of passenger UEs 1920-1 to 1920-5. As another example, the vehicle UE 1910 may store the state information about the plurality of passenger UEs 1920-1 to 1920-5 through a network (or a gateway 1950) in a vehicle server 1930 or an application server 1940 and manage the state information.

The vehicle server 1930 supports services for the plurality of passenger UEs 1920-1 to 1920-5 using group information 1960. In examples, the vehicle server 1930 (or application server 1940) may provide travel information or advertisements based on passenger information and vehicle traveling information, or the vehicle UE 1910 (or a UE) may support mobility management for the group members (the plurality of passenger UEs 1920-1 to 1920-5) through the group information 1960.

Figure 20:
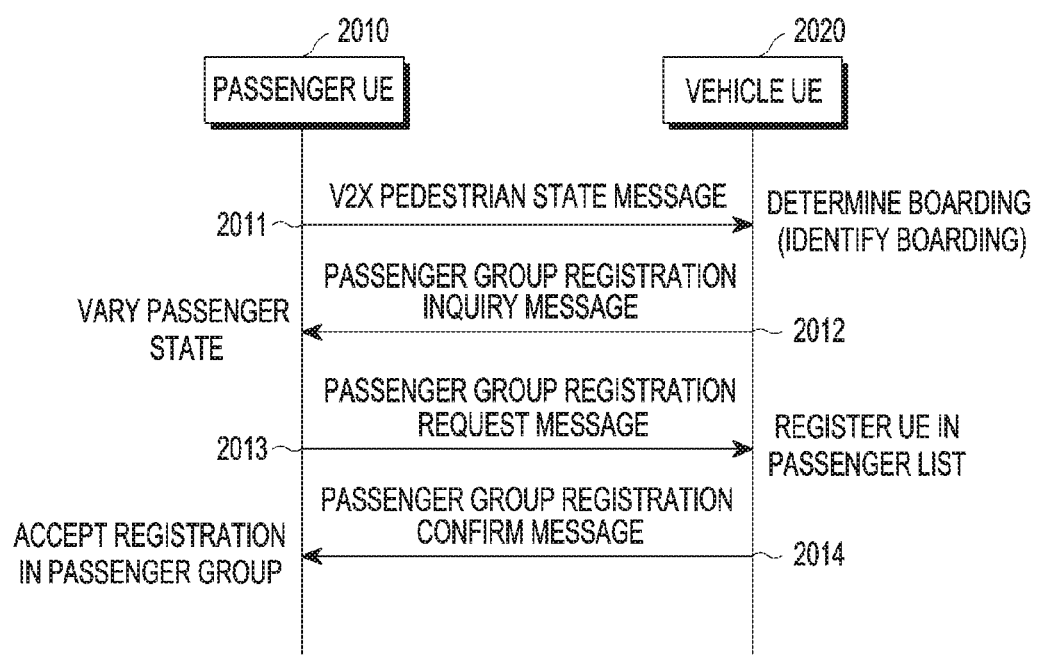
FIG. 20 illustrates a passenger UE group registration method according to an embodiment.

FIG. 20 illustrates a passenger UE group registration method according to an embodiment.

A passenger list (or group information) may include IDs of passenger UEs, boarding locations, boarding times, and additional information necessary to support V2Pa services. The vehicle UE may provide a destination notification or advertisement information using the alighting location information where the passenger list contains alighting location information.

Referring to FIG. 20, a pedestrian UE 2010 and a vehicle UE 2020 communicate messages to register as a passenger UE. The pedestrian UE 2010 transmits a V2X pedestrian state message in step 2011. The vehicle UE 2020 identifies whether it is on-board. Where the pedestrian UE 2010 is identified to be on-board, the vehicle UE 2020 sends a passenger group registration inquiry message to the pedestrian UE 2010 in step 2012. The pedestrian UE 2010 sends a passenger group registration request message to the vehicle UE 2020 to notify the vehicle UE 2020 that it is on-board and to register in the passenger group in step 2013. Unless the pedestrian UE 2010 desires to register in the passenger group, the pedestrian UE 2010 may send out a reject message. Upon receipt of the passenger group registration request message, the vehicle UE 2020 registers the pedestrian UE 2010 in the passenger list. Upon receipt of the reject message, the vehicle UE 2020 stores the information indicating whether the pedestrian UE 2010 is on-board and refrain from registering in the passenger list. In this case, the vehicle UE 2020 may not separately provide services to the pedestrian UE 2010. The vehicle UE 2020 sends a passenger group registration confirm message to the pedestrian UE 2010 in step 2014. Finally, the pedestrian UE 2010 may accept to register in the passenger list.

In the embodiment of FIG. 20, the passenger list registration process proceeds starting with the delivery of a V2X pedestrian state message from the pedestrian UE 2010 to the vehicle UE 2020. Embodiments of the disclosure are not limited thereto. For example, an alternative passenger list registration process is also possible in which the vehicle UE 2020 sends a V2X vehicle state message to the pedestrian UE 2010, the pedestrian UE 2010 sends a passenger group registration request message to the vehicle UE 2020, the vehicle UE 2020 sends a passenger group registration confirm message to the pedestrian UE 2010, and the pedestrian UE 2010 sends a V2X passenger state message to the vehicle UE 2020. Other various passenger list registration processes are also available.

Figure 21A:
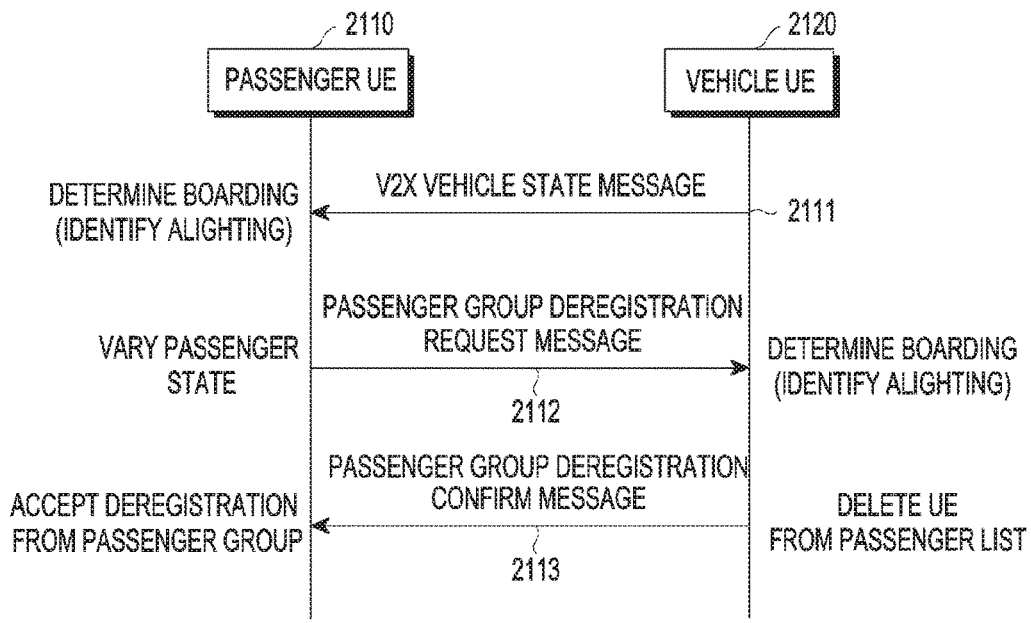
FIGS. 21A and 21B illustrate a passenger UE group deregistration method according to an embodiment.
Figure 21B:
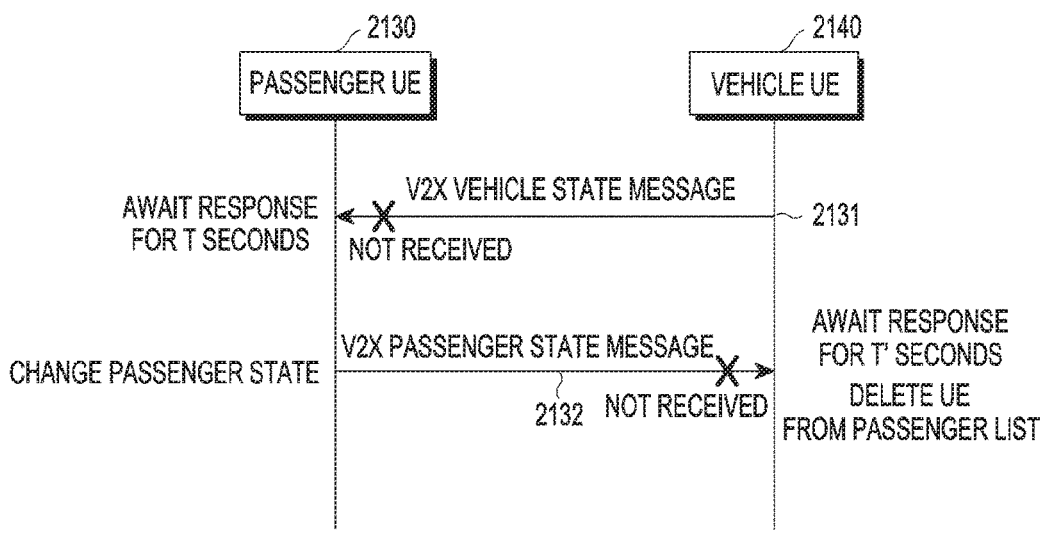

FIGS. 21A and 21B illustrate a passenger UE group deregistration method according to embodiments.

Referring to FIG. 21A, a vehicle UE 2120 sends a V2X vehicle state message to a passenger UE 2110 in step 2111. Where the passenger UE 2110 is off-board the vehicle, the passenger UE 2110 turns its state into passenger. The passenger UE 2110 sends a passenger group deregistration request message to the vehicle UE 2120 in step 2112. The vehicle UE 2120 identifies the alighting of the passenger UE 2110. The vehicle UE 2010 deletes the passenger UE 2110 from the passenger list and sends a passenger group deregistration confirm message to the passenger UE 2110 in step 2113. The passenger UE 2110 accepts the deregistration from the passenger group.

Referring to FIG. 21B, a vehicle UE 2140 sends a V2X vehicle state message to a passenger UE 2130 in step 2131. Upon failing to receive the V2X vehicle state message within a preset time limit such as T seconds, the passenger UE 2130 turns its state into pedestrian. The time limit may be set to a transmission period during which one to three state messages are transmitted. The passenger UE 2130 sends a V2X passenger state message to the vehicle UE 2140 in step 2132. Upon failing to receive the V2X passenger state message within T' seconds, the vehicle UE 2140 deletes the passenger UE 2130 from the passenger list. Upon receipt of the V2X passenger state message, the vehicle UE 2140 may also delete the passenger UE 2130 from the passenger list.

The vehicle UE 2140 may manage the group through state information received from the UEs of the passenger group. In this case, the state information about the passenger UEs may be updated with periodically received state messages. The state information about the passenger UEs may also be managed using state information received during a group registration process. Where passenger/pedestrian differentiation is performed via wired connection, the vehicle UE may periodically receive state information about the passenger UEs through the wired connection and update the list.

The passenger UEs may communicate with each other via V2Pa communication. As an example, the passenger UEs may set a representative ID upon communication. The representative ID may be of the vehicle or a separate group ID. As another example, the passenger UEs may communicate with each other using their respective IDs.

The vehicle UE (or the vehicle server) may support safety- or convenience-related V2Pa services based on the state information stored in the passenger list. The passenger list may contain various pieces of information, such as the passenger UEs' IDs, billing information as per serving, and off-boarding location information. V2Pa services may be operated by the entity in charge of the passenger group information.

Providing a service when passenger group information is managed by the vehicle server is described below with reference to FIG. 22.

Figure 22:
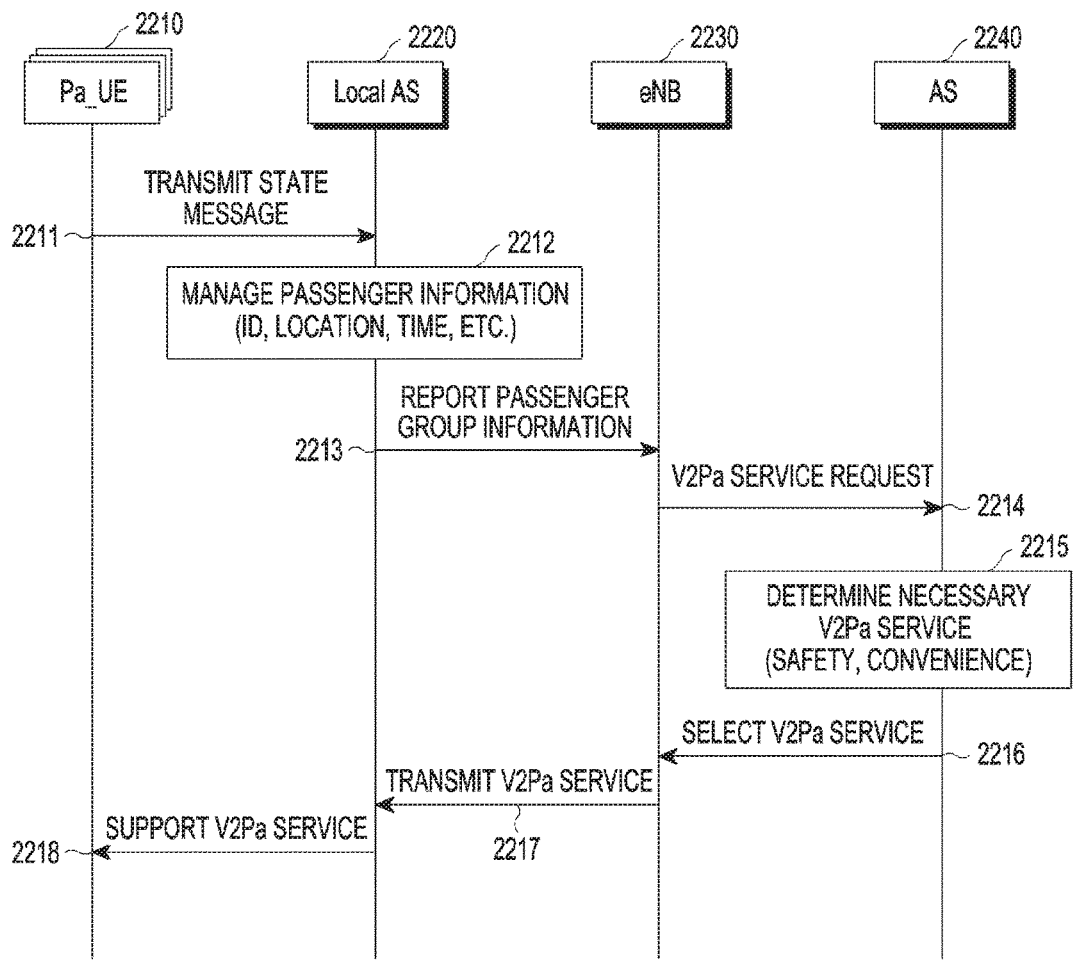
FIG. 22 illustrates an example of providing a service according to an embodiment.

FIG. 22 illustrates an example of providing a service according to an embodiment.

A local application server 2220 equipped in the vehicle may manage the passenger list. The passenger UE 2210 transmits a state message to the local application server 2220 through short-range communication or PC5 in step 2211. The local application server 2220 creates a passenger list based on passenger state information or requirements and manages the passenger list in step 2212. For example, the local application server 2220 may manage items, such as UE ID, location, and time. The local application server 2220 sends passenger list information to a base station 2230 in step 2213. The passenger list information may periodically be transmitted. The base station 2230 sends a V2Pa service request to an application server 2240 in step 2214. The application server 2240 determines a necessary V2Pa service in step 2215. The V2Pa service may be a safety- or convenience-related service. The application server 2240 provides the selected V2Pa service to the base station 2230 in step 2216. The base station 2230 transmits the V2Pa service to the local application server 2220 in step 2217. The local application server 2220 supports the V2Pa service for the passenger UE (Pa_UE) 2210 in step 2218. The local application server 2220 may directly provide information, such as image or sensing information obtained by the vehicle to the Pa_UE 2210.

Figure 23:
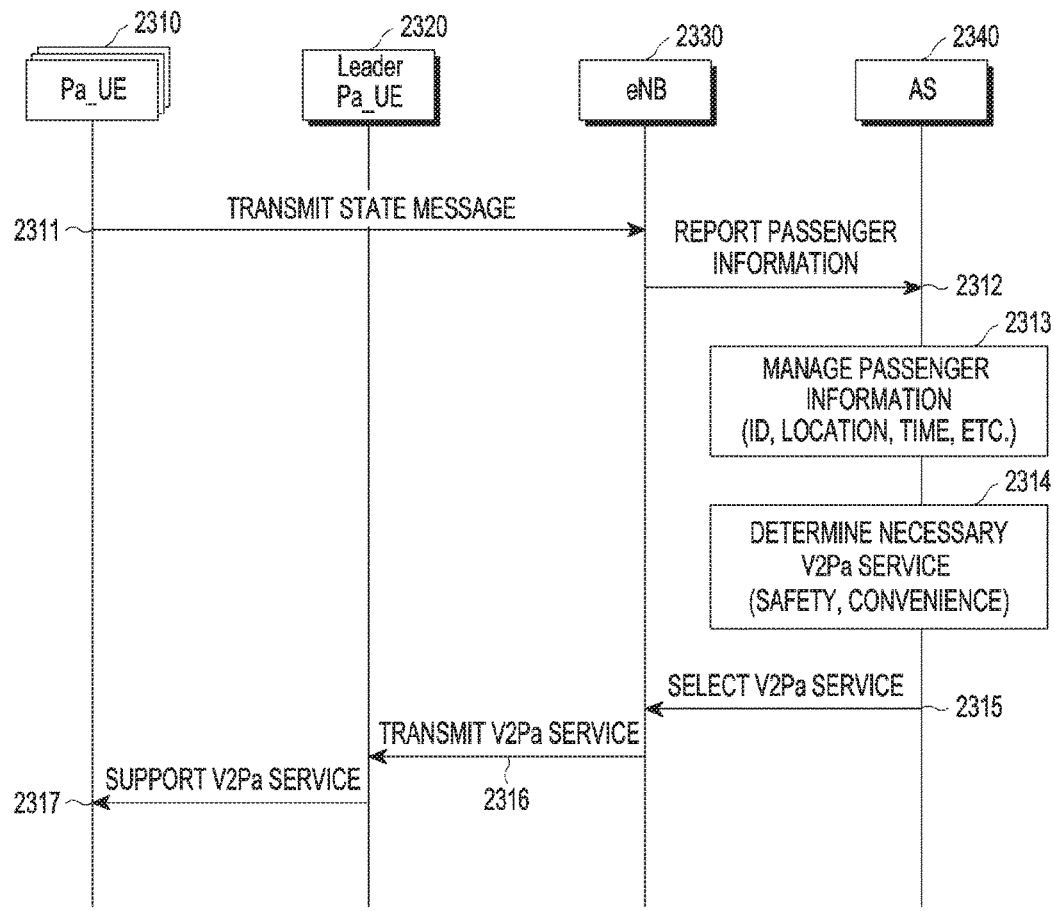
FIG. 23 illustrates an example of providing a service according to an embodiment.

FIG. 23 illustrates an example of providing a service according to an embodiment.

FIG. 23 concerns an embodiment where the vehicle lacks any server.

Referring to FIG. 23, a Pa_UE 2310 sends a state message to a base station 2330 in step 2311. The base station 2330 reports passenger information to an application server 2340 in step 2312. The application server 2340 may form a group of passenger UEs and select a leader Pa_UE of the group in step 2313. The application server 2340 may also determine a necessary V2Pa service in step 2314. The application server 2340 provides the selected V2Pa service to the base station in step 2315, and the base station 2330 provides the V2Pa service to the leader Pa_UE 2320 in step 2316. The leader Pa_UE 2320 provides the V2Pa service to the Pa_UE 2310 in step 2317.

Figure 24:
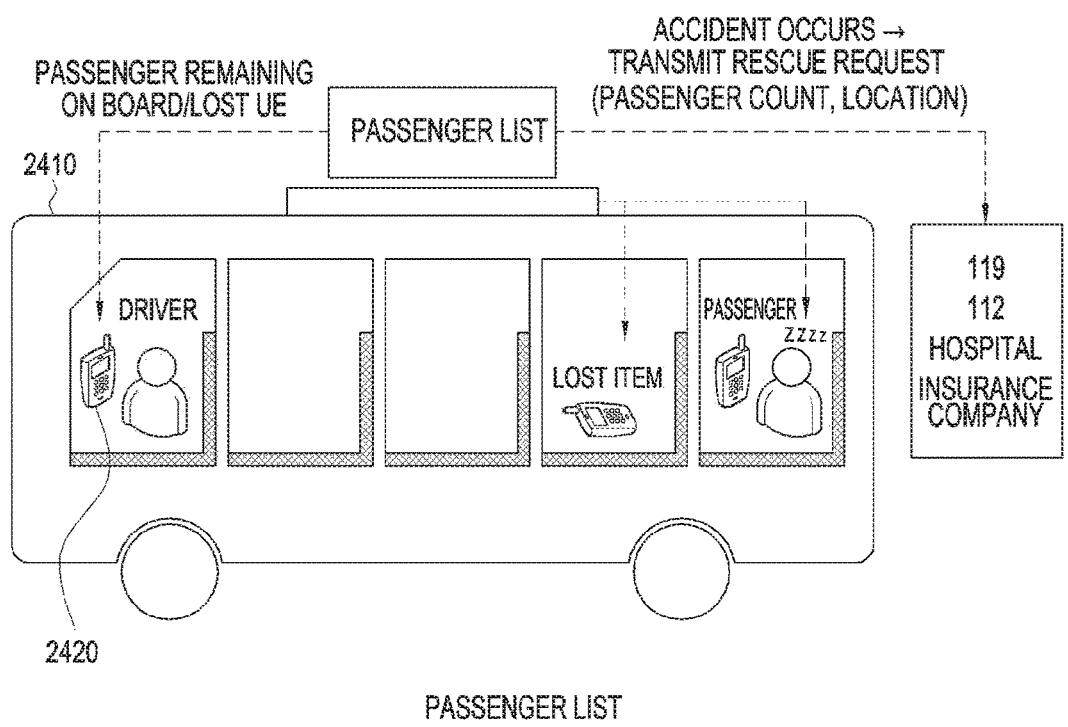
FIG. 24 illustrates a serving method according to an embodiment.

FIG. 24 illustrates a serving method according to an embodiment.

Referring to FIG. 24, a vehicle or a vehicle UE 2410 manages a passenger list. As an example, where the passenger UE does not exit the vehicle 2410 at the destination, the vehicle or vehicle UE 2410 may notify a driver UE 2420 of the passenger UE's alighting. As another example, where an accident occurs, the vehicle UE 2410 may transmit a rescue request to a hospital based on the passenger list. The rescue request may contain the location information about the vehicle 2410 and the passenger count.

Figure 25:
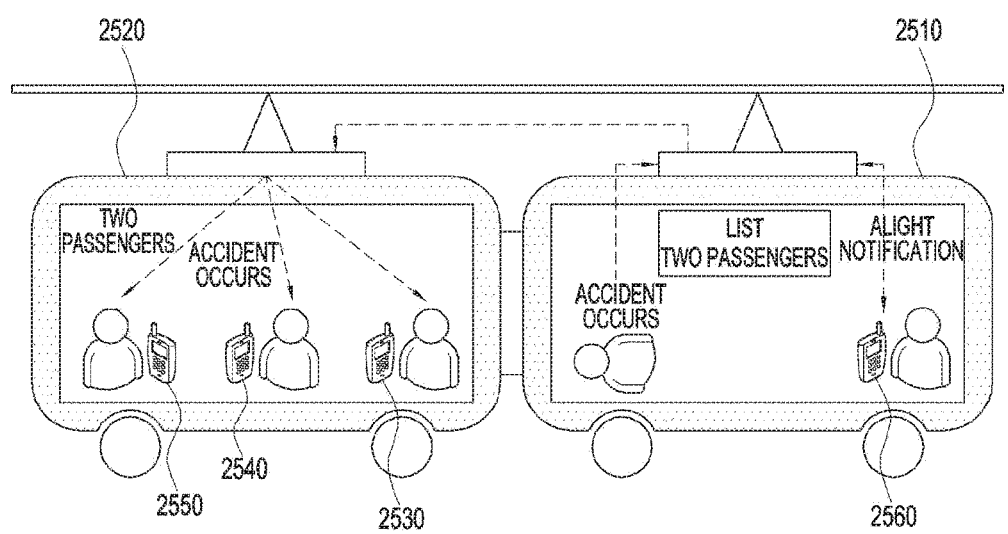
FIG. 25 illustrates a serving method according to an embodiment.

FIG. 25 illustrates a serving method according to an embodiment.

In FIG. 25, a (subway) train is illustrated with a first carriage 2510 and a second carriage 2520 coupled together. As an example, where a fire breaks out in the first carriage 2510, the first carriage 2510 sends passenger list information to the passenger UEs 2530, 2540, and 2550 in the second carriage 2520, alerting them to the danger. As another example, the first carriage 2510 may provide alighting notification information to the passenger UE 2560 in the first carriage 2510 using the passenger list.

Figure 26:
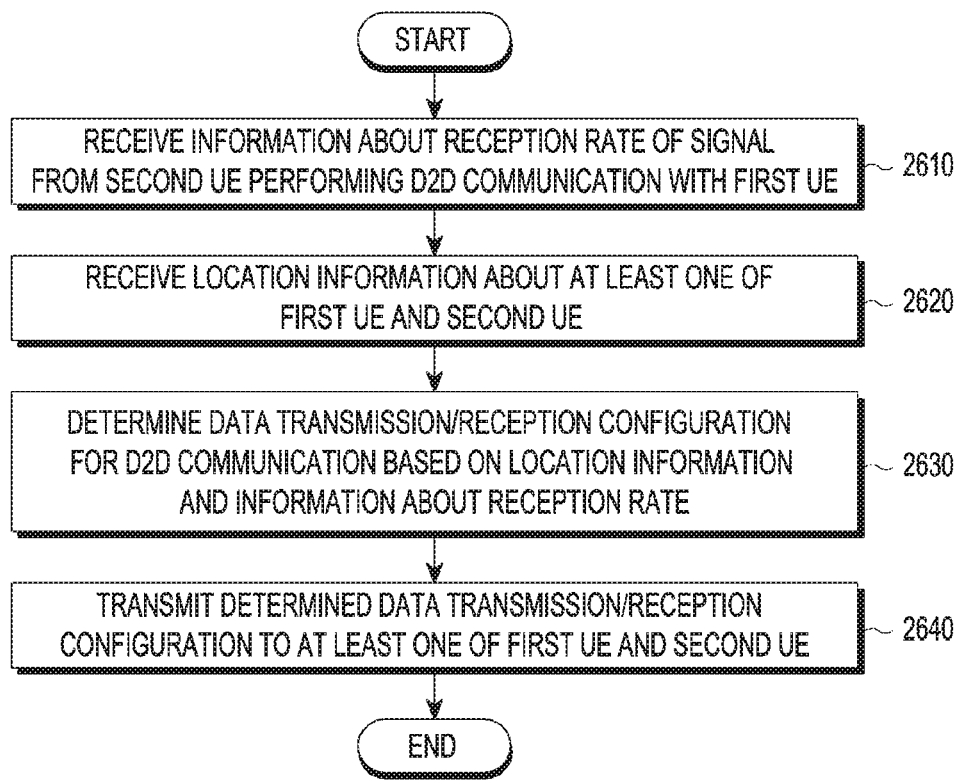
FIG. 26 illustrates a data transmission/reception method according to an embodiment.

FIG. 26 illustrates a data transmission/reception method according to an embodiment.

A data transmission/reception method includes receiving information about a reception rate of a signal from a second UE performing D2D communication with a first UE in step 2610, receiving location information about at least one of the first UE and the second UE in step 2620, determining a data transmission/reception configuration for the D2D communication based on the reception rate information and the location information in step 2630, and transmitting the determined data transmission/reception configuration to at least one of the first UE and the second UE in step 2640.

Figure 27:
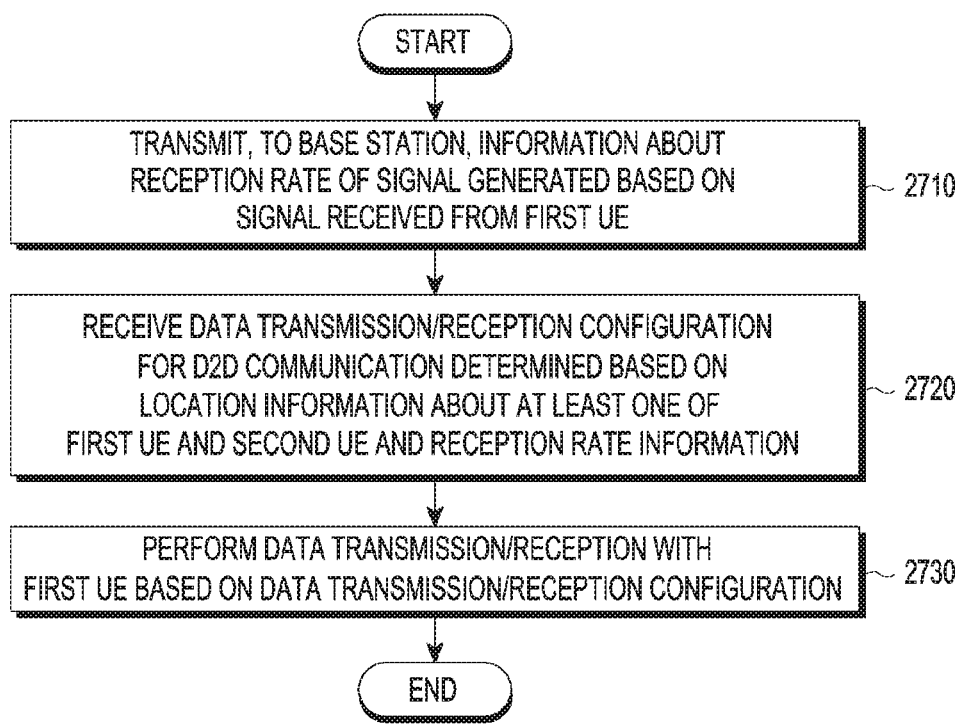
FIG. 27 illustrates a data transmission/reception method according to an embodiment.

FIG. 27 illustrates a data transmission/reception method according to an embodiment.

A data transmission/reception method includes transmitting information about a reception rate of a signal to a base station, the signal received from a first UE, and the reception rate information generated based on the signal in step 2710, receiving a data transmission/reception configuration for the D2D communication determined based on location information about at least one of the first UE and the second UE and the reception rate information in step 2720, and performing data transmission/reception with the first UE based on the data transmission/reception configuration in step 2730.

The data transmission/reception methods set forth above may be implemented in program codes executable on a computer and stored in various non-transitory computer readable media to be run by a processor that may be provided to each server or device.

As an example, there may be provided a non-transitory computer readable medium storing a program to perform operations including receiving information about a reception rate of a signal from a second UE performing D2D communication with a first UE, receiving location information about at least one of the first UE and the second UE, determining a data transmission/reception configuration for the D2D communication based on the reception rate information and the location information, and transmitting the determined data transmission/reception configuration to at least one of the first UE and the second UE.

As another example, there may be provided a non-transitory computer readable medium storing a program to perform operations including transmitting information about a reception rate of a signal to a base station, the signal received from a first UE, and the reception rate information generated based on the signal, receiving a data transmission/reception configuration for the D2D communication determined based on location information about at least one of the first UE and the second UE and the reception rate information, and performing data transmission/reception with the first UE based on the data transmission/reception configuration.

The above-described various applications or programs may be stored and provided in a non-transitory computer readable medium, such as a compact disc (CD), digital versatile disc (DVD), hard disk, Blu ray disk, USB, memory card, and read only memory (ROM).

As set forth above, according to the disclosure, an enhanced reception rate and minimized terminal power consumption can be achieved even in a poor communication environment.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method for device-to-device (D2D) communication, the method comprising:
   receiving, from a second user equipment (UE) performing D2D communication with a first UE, information about a reception rate generated by the second UE based on a signal from the first UE, wherein the information about the reception rate includes information indicating whether the reception rate increases or decreases in the second UE;
   receiving location information about at least one of the first UE or the second UE;
   determining a data communication configuration for the D2D communication based on the information about the reception rate and the location information; and
   transmitting the determined data communication configuration to at least one of the first UE or the second UE.

2. The method of claim 1, wherein determining the data communication configuration includes:
   determining a received signal strength based on the information about the reception rate;
   determining a distance between the first UE and the second UE based on the location information; and
   determining the data communication configuration for the D2D communication based on the received signal strength and the distance.

3. The method of claim 1, further comprising:
   receiving, from the first UE, information about a number of UEs located within a preset distance from the first UE,
   wherein determining the communication configuration further includes considering the information about the number of the UEs.

4. The method of claim 1, wherein the determined data communication configuration is one of a configuration to increase a transmit power or a transmission rate.

5. The method of claim 1, wherein the determined data communication configuration is a sensing-based resource selection scheme.

6. A base station, comprising:
   a transceiver; and
   a processor, wherein the processor is configured to:
   control the transceiver to receive, from a second user equipment (UE) performing device-to-device (D2D) communication with a first UE, information about a reception rate generated by the second UE based on a signal from the first UE, wherein the information about the reception rate includes information indicating whether the reception rate increases or decreases in the second UE,
   control the transceiver to receive location information about at least one of the first UE or the second UE,
   determine a data communication configuration for D2D communication based on the information about the reception rate and the location information, and
   control the transceiver to transmit the determined data communication configuration to at least one of the first UE or the second UE.

7. The base station of claim 6, wherein the processor is further configured to:
   determine a received signal strength based on the information about the reception rate;
   determine a distance between the first UE and the second UE based on the location information; and
   determine the data communication configuration for the D2D communication based on the received signal strength and the distance.

8. The base station of claim 6,
   wherein the processor is further configured to:
   control the transceiver to receive, from the first UE, information about the number of UEs located within a preset distance of the first UR, and
   determine the data communication configuration for the D2D communication further considering the information about the number of the UEs.

9. The base station of claim 6, wherein the determined communication configuration is one of increasing transmit power and increasing a transmission rate.

10. The base station of claim 6, wherein the determined data communication configuration is a sensing-based resource selection scheme.

11. A method for device-to-device (D2D) communication by a second user equipment (UE) performing D2D communication with a first UE, the method comprising:

transmitting, to a base station, information about a reception rate-, wherein the information about the reception rate is generated based on a signal received from the first UE, wherein the information about the reception rate includes information indicating whether the reception rate increases or decreases in the second UE;

receiving a data communication configuration for the D2D communication determined based on location information about at least one of the first UE or the second UE and the information about the reception rate; and performing data communication with the first UE based on the data communication configuration.

12. The method of claim 11, wherein the data communication configuration is determined based on a received signal strength determined based on the reception rate information and a distance between the first UE and the second UE determined based on the location information.

13. The method of claim 11, wherein the data communication configuration is determined further considering information about a number of UEs located within a preset distance of the first UE.

14. The method of claim 11, wherein the data communication configuration is one of increasing transmit power and increase a transmission rate.

15. The method of claim 11, wherein the data communication configuration is a sensing-based resource selection scheme.

16. A second user equipment (UE) configured to perform device-to-device (D2D) communication with a first UE, the second UE comprising:

a transceiver; and a processor configured to:

control the transceiver to transmit, to a base station, information about a reception rate, wherein the information about the reception rate is generated based on a signal received from the first UE, control the transceiver to receive a data communication configuration for the D2D communication determined based on location information about at least one of the first UE or the second UE and the information about the reception rate, and perform data communication with the first UE based on the data communication configuration.

17. The second UE of claim 16, wherein the data communication configuration is determined based on a received signal strength determined based on the information about the reception rate and a distance between the first UE and the second UE determined based on the location information.

18. The second UE of claim 16, wherein the data communication configuration is determined further considering information about a number of UEs located within a preset distance of the first UE.

19. The second UE of claim 16, wherein the data communication configuration is one of increasing transmit power or increasing a transmission rate.

20. The second UE of claim 16, wherein the data communication configuration is a sensing-based resource selection scheme.

* * * * *